United States Patent [19]

Karis

[11] Patent Number: 5,521,844
[45] Date of Patent: May 28, 1996

[54] PRINTING PRESS MONITORING AND ADVISING SYSTEM

[75] Inventor: Arthur T. Karis, Stephentown, N.Y.

[73] Assignee: Beloit Corporation, Beloit, Wis.

[21] Appl. No.: 120,213

[22] Filed: Sep. 10, 1993

[51] Int. Cl.⁶ .................................................. G05B 15/00
[52] U.S. Cl. ..................... 364/551.01; 395/912; 364/471
[58] Field of Search ............................ 364/551.01, 469, 364/400, 188, 526, 550, 471; 395/575, 912, 914; 355/101, 203, 207

[56] References Cited

U.S. PATENT DOCUMENTS

| | | | |
|---|---|---|---|
| 3,767,900 | 10/1973 | Chao et al. | 364/151 |
| 4,098,641 | 7/1978 | Casey et al. | 162/198 |
| 4,200,932 | 4/1980 | Schramm et al. | 364/400 |
| 4,346,446 | 8/1982 | Erbstein et al. | 364/551.01 |
| 4,366,542 | 12/1982 | Anselrode | 364/469 |
| 4,495,582 | 1/1985 | Dessert et al. | 364/469 |
| 4,538,515 | 9/1985 | Tymkewicz et al. | 364/469 |
| 4,639,881 | 1/1987 | Zingher | 364/188 |
| 4,649,515 | 3/1987 | Thompson et al. | 395/61 |
| 4,701,857 | 10/1987 | Robinson | 364/477 |
| 4,707,779 | 11/1987 | Hu | 364/148 |
| 4,752,889 | 7/1988 | Rappaport et al. | 395/12 |
| 4,849,905 | 7/1989 | Loeb et al. | 395/64 |
| 4,866,634 | 9/1989 | Reboh et al. | 364/408 |
| 4,884,217 | 11/1989 | Skeirik et al. | 395/66 |
| 4,901,247 | 2/1990 | Wakimoto et al. | 395/115 |
| 4,907,167 | 3/1990 | Skeirik | 74/490.03 |
| 4,916,625 | 4/1990 | Davidson et al. | 364/470 |
| 4,918,620 | 4/1990 | Ulug | 395/75 |
| 4,920,499 | 4/1990 | Skeirik | 395/12 |
| 4,931,951 | 6/1990 | Murai et al. | 364/274.2 |
| 4,965,741 | 10/1990 | Winchell et al. | 364/485 |
| 4,985,857 | 1/1991 | Bajpai et al. | 395/912 |
| 5,006,992 | 4/1991 | Skeirik | 395/11 |
| 5,058,043 | 10/1991 | Skeirik | 364/550 |
| 5,060,132 | 10/1991 | Beller et al. | 364/158 |
| 5,067,099 | 11/1991 | McCown et al. | 364/550 |
| 5,090,909 | 2/1992 | Kellar et al. | 434/43 |
| 5,103,498 | 4/1992 | Lanier et al. | 395/68 |
| 5,107,500 | 4/1992 | Wakamoto et al. | 395/916 |
| 5,119,318 | 6/1992 | Paradies et al. | 395/61 |
| 5,121,467 | 6/1992 | Skeirik | 395/11 |
| 5,133,045 | 7/1992 | Gaither et al. | 395/51 |
| 5,133,046 | 7/1992 | Kaplan | 395/912 |
| 5,138,377 | 8/1992 | Smith et al. | 355/207 |
| 5,182,803 | 1/1993 | Rodi et al. | 395/575 |
| 5,187,773 | 2/1993 | Hamilton et al. | 395/912 |
| 5,258,925 | 11/1993 | Maier et al. | 364/526 |

OTHER PUBLICATIONS

"Graphical Access to Medical Expert Systems: II. Design of an Interface for Physicians", by C. D. Lane, Joan D. Walton, and E. H. Shortliffe, *Methods of Information Medicine*, 25:143–150, 1986.

"Using Fuzzy Sets to Diagnose Coronary Artery Stenosis", Krzysztof J. Cios and Inho Shin, University of Toledo, Lucy S. Goodenday, Mar., 1991.

"Explanation Based Indexing of Case", R. Barlette and W. Mark. Paper published in Proceedings of AAAI–88, Aug., 1988.

"Using a Case Memory to Integrate Case–Based and Casual Reasoning", Phyllis Koton, Aug., 1988.

"Multi–Level Expert Control of a Large–Scale Industrial Process" by Robert E. King & Fotis C. Karonis, Elsevier Science Publishers B.V. (North–Holland), 1988.

"Development of Performance Adaptive Fuzzy Controllers with Application to Continuous Casting Plants" by G. Bartolini et al., M. Sugeno (ed), Elsevier Science Publishers B.V. (North–Holland), 1985.

*Primary Examiner*—Emanuel T. Voeltz
*Assistant Examiner*—Kyle J. Choi
*Attorney, Agent, or Firm*—McAndrews, Held & Malloy, Ltd.

[57] ABSTRACT

A printing press monitoring and advising system is shown utilizing an inference engine to analyze the operation of the press intelligently. The system analyzes detected press and paper characteristics in accordance with a symptom table, conclusion table, and symptom/conclusion table to advise the operator as to press operation settings, such as tension settings, prior to the start of press operations; possible problems during press operations, and the type and/or the cause of defects as such defects are detected by the system.

44 Claims, 21 Drawing Sheets

FIG. 6

SYMPTOM TABLE — 90

| SYMPTOM NO. | DESCRIPTION BRIEF | DESCRIPTION FULL | CERTAINTY FACTOR | VALUE LOW & HIGH | VARIABLE | OPERATOR =^v | TYPE OF ANSWER | STRING ANSWER | NUMERICAL ANSWER |
|---|---|---|---|---|---|---|---|---|---|
| 104 | | | | 92 | 94 | 96 | 98 | 100 | 102 |

FIG. 7

CONCLUSION TABLE — 120

| CONCLUSION NO. | SETTING/ DEFECT NAME | CONFIDENCE FACTOR -1000→0→+100 | KEY SYMPTOM | CAUSE | FAMILY OF DEFECT |
|---|---|---|---|---|---|
| 122 | | | | | |

FIG. 8

SYMPTOM/CONCLUSION TABLE — 103

| CONCLUSION NO. | RELATIONSHIP | SYMPTOM NO. | EXPLANATION | WEIGHT |
|---|---|---|---|---|
| 104 | 110 | 106 | | 108 |

FIG. 9

| ROLL RECORD CARD | | | # 194094 | |
|---|---|---|---|---|
| PRESS OPER. | SHIFT | REEL | A | B |
| JOB NAME | FORM # | CORE TYPE | S | F |
| MILL | BASIS | ROLLTENDER | | |
| DATE | PRESS | GRADE | | |
| JOB # | FORM TYPE | CUTOFF 33 1/2 | 34 1/2 38 | 39 |
| WIDTH | GRADE | 40 | 41 42 | 43 |

ROLL #   LOT L #   ROLL WEIGHT   COUNTER READING

HELP   PRINT   ABORT   EXIT SAVING

FIG. 10

| PRESS OPER. | | | | | SHIFT | | | | ROLL RECORD CARD | | | | | | | | | | | | | # 194094 | |
|---|---|---|---|---|---|---|---|---|---|---|---|---|---|---|---|---|---|---|---|---|---|---|---|
| JOB NAME | | | | | FORM # | | | | | | REEL | | | A | | | B | | | |
| MILL | | | | | BASIS | | | | | | CORE TYPE | | | | | | S | F |
| DATE | | | | | PRESS | | | | | | ROLLTENDER | | | | | | | |
| JOB # | | | | | FORM TYPE | | | | | | GRADE | | 33 1/2 | 34 1/2 | 38 | 39 |
| WIDTH | | | | | GRADE | | | | | | CUTOFF | | 40 | 41 | 42 | 43 |
| BREAK #1 | | | BREAK #2 | | | BREAK #3 | | | COMMENTS | | | | | | | | | | | | | | |
| TYPE | LOC | DIA | TYPE | LOC | DIA | TYPE | LOC | DIA | | | | | | | | | | | | | | | |

HELP · PRINT · ABORT · EXIT SAVING

FIG. 20

PRINTING PRESS MONITORING AND ADVISING SYSTEM

TECHNICAL FIELD

The present invention is directed to a system for monitoring the operation of a printing press and for advising the operator as to press system settings prior to operation, possible problems during press operation, and the most probable type and/or cause of defects as such defects are detected by the system.

BACKGROUND OF THE INVENTION

Systems are known for monitoring the operation of a press that prints on a roll of paper. These systems typically include a number of sensors that detect tension of the paper at various positions along the press and the speed of the paper. The data from these sensors is collected so that a printout of the data can be obtained for a later review by an expert if problems occur in the operation of the press. Problems in press operation can be very costly. For example, if a break in the paper occurs during printing, the operation of the press must be shut down for a considerable amount of time. Further, the paper damaged by the break must be disposed of resulting in a considerable waste of resources. Due to a lack of information relating to the press room, the history of individual presses and the history of paper from individual suppliers, the press operator's ability to optimize quality, efficiency, and throughput of the press is very limited. Even if all of the relevant data could be available, only individuals with years of experience in all areas of the paper-making industry, as well as in the printing industry, are sufficiently knowledgeable to analyze the data to determine the cause of problems. These individuals are rare and not available for constant supervision of each press in a press room. Further, although off-line artificial intelligence systems have been known for use with a press to provide post-press operation diagnostics after a problem such as a break in the paper web occurs, such systems do not advise the operator prior to start up or during the operation of the press.

SUMMARY OF THE INVENTION

In accordance with the present invention, the disadvantages of prior printing press monitoring systems have been overcome. The printing press monitoring system of the present invention monitors the operation of a printing press and characteristics of the paper being run thereon so as to advise the operator regarding desirable press operation settings prior to the start of the press, possible problems during the operation of the press, and the type and/or the cause of defects as such defects are detected by the monitoring system.

More particularly, the printing press monitoring system of the present invention stores historical data representing previously-run rolls of paper and past-press operations. In response to input data identifying a particular press and a particular roll of paper, a start-up software module analyzes the input data with respect to the historical data to advise the press operator as to recommended press operation settings, such as the tension levels at various positions along the press, the temperature of the ink used in the press, the ratio of ink-to-ink solvent, etc. In one embodiment of the present invention the set-up software module is an inference engine which utilizes information stored in a symptom table identifying a number of input data symptoms, as well as historical data symptoms; information stored in a conclusion table identifying a number of various press operation settings, and information in a symptom/conclusion table relating each press operation setting to at least one symptom in the symptom table. In accordance with this embodiment, a confidence value is assigned to the press operation settings based upon the input and historical data symptoms and information stored in the symptom/conclusion table. Thereafter, the press operation settings are sorted according to highest to lowest confidence value to determine the preferred press operation settings.

During the operation of the press, input data from a number of press operation detecting sensors and paper characteristic detecting sensors are monitored. The input data represents various symptoms of the press and paper being run thereon. The input data symptoms are monitored so that the system can automatically advise the operator of possible problems that might arise during press operations. The input data symptoms are also monitored to advise the operator in real time as to actual problems that have occurred. For example, if a break in the paper occurs, the system automatically determines the most likely type of and/or cause of the break and displays this information to the user immediately. Because the input data is analyzed by the system in real time as potential and actual problems are detected, the problems can be corrected without having to wait for an expert to become available. The real time analysis of potential problems, as well as actual problems, minimizes down time of the press and waste of resources.

More particularly, in response to input data received during press operation, the system determines the occurrence of an event representing a likelihood of a defect in the paper-printing operations or representing an actual defect and in response to such an event, an inference engine is implemented to analyze the data. The inference engine analyzes the input data symptoms utilizing information stored in a symptom table identifying a number of symptoms; information stored in a conclusion table identifying each type of a number of defects and/or the causes of such defects, and information stored in a symptom/conclusion table relating each defect in the defect table to at least one symptom in the symptom table. During this analysis, a confidence value is assigned to the defect type and/or cause, based upon information stored in the symptom/conclusion table. Thereafter, the defect types/causes are sorted from highest to lowest according to the assigned confidence values. Information identifying the type and/or cause of the actual or possible defect having the highest assigned confidence value can then be displayed to the operator.

Thus, an expert, intelligent printing press monitoring system is provided to monitor, analyze, and advise the operator as to various press operations in real time so as to increase the efficiency, throughput, and quality of press operations. These and other objects, advantages, and novel features of the present invention, as well as details of an illustrated embodiment thereof, will be more fully understood from the following description and from the drawing.

BRIEF DESCRIPTION OF THE DRAWING

FIG. 6 is an illustration of a symptom table stored in the system depicted in FIG. 1;

FIG. 7 is an illustration of a conclusion table stored in the system depicted in FIG. 1;

FIG. 8 is an illustration of a symptom/conclusion table stored in the system depicted in FIG. 1;

FIG. 9 is an illustration of a roll record card displayed on the system depicted in FIG. 1;

FIG. 10 is an illustration of additional columns displayed for the roll record card depicted in FIG. 9;

FIG. 20 is a defect analysis screen displayed by the system of FIG. 1;

DESCRIPTION OF THE PREFERRED EMBODIMENT

Figure 1:
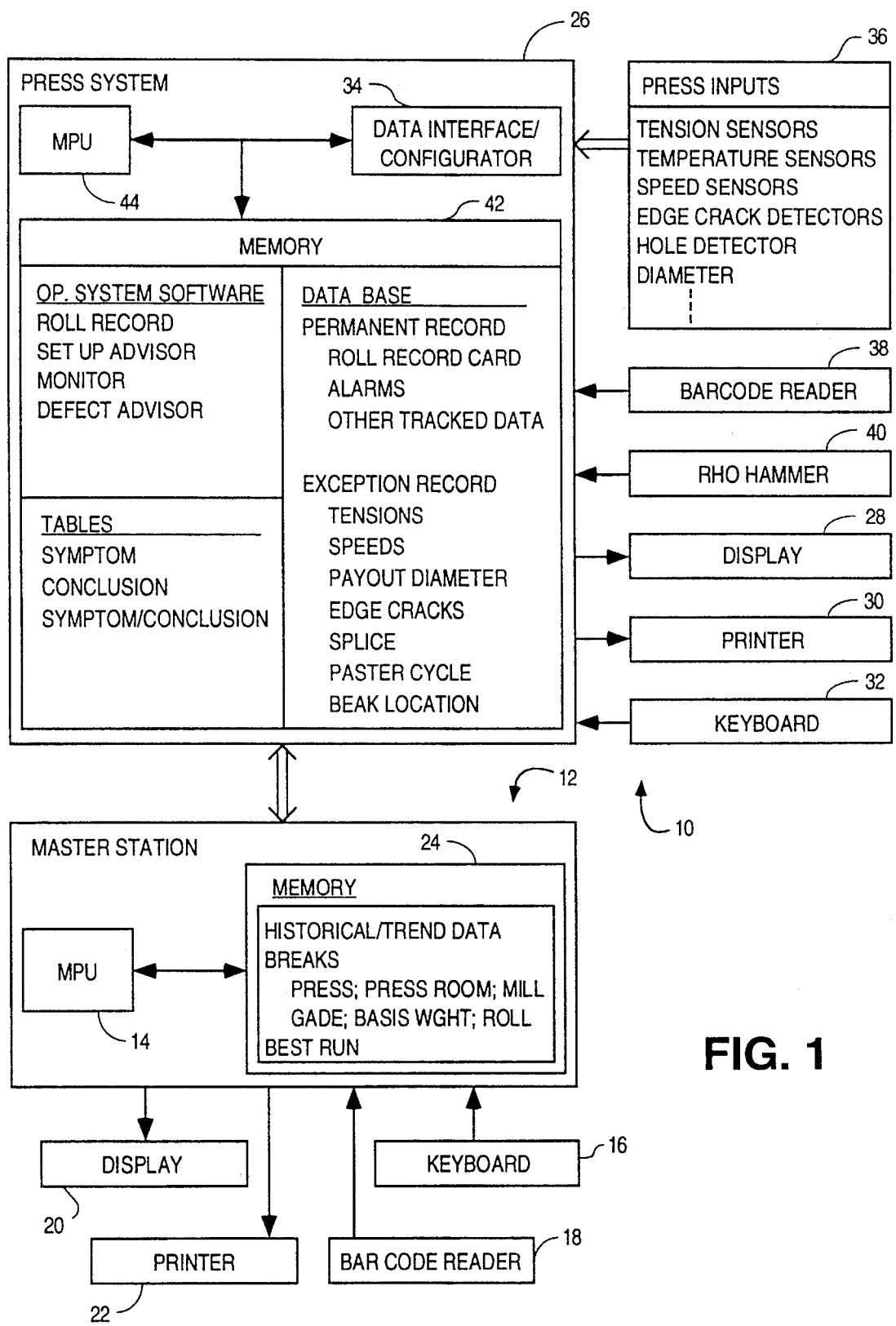
FIG. 1 is a block diagram of the printing press monitoring and advising system of the present invention.

The printing press monitoring and advising system of the present invention includes at least one press station 10 for each printing press in a press room. Each press station 10 is coupled to a master station 12 for communication therebetween. The master station 12 may be a microprocessor 14 based station, such as a personal computer or the like, that includes a keyboard 16 and a bar code reader 18 for inputting information and a display 20 and printer 22 for outputting information. The master station 12 stores in a memory 24 historical/trend data relating to rolls of paper previously run on the presses in the press room, as well as data relating to individual presses in the press room. This data includes information identifying each mill supplying paper to the press room, the grade and basis weight of the paper supplied, data specific to each roll of paper, as well as data correlating this information to the number and time of occurrence of breaks, and best run information. The master station 12 receives data collected by each press station 10 in the press room for continuously updating the knowledge base stored in the memory 24. The data stored in the memory 24 is available to each press station 10 that is in communication with the master station 12 so that the press stations 10 can use the information in the analysis performed thereby. Although the analysis of press operations, problems and defects occurring in the paper during printing may be analyzed by each individual press station 10 in real time in accordance with the present invention, as discussed in detail below, the master station 12 may also perform such an analysis or an even more detailed analysis at a later time.

In accordance with the present invention, the press station 10 monitors press operations and advises the press operator in real time as to potential and actual problems in order to minimize down time of the press monitored by the station 10 and to minimize the waste of resources, such as paper, ink, etc. The press station 10 may include a single personal computer 26 or the like having a display 28, printer 30, and keyboard 32, the station 10 including a data interface/configurator 34 for receiving data input thereto from a number of sensors 36, a bar code reader 38, and a RHO hammer 40. It is noted, however, that because of the large size of some printing presses it may be desirable to form the press station 10 with a number of networked P.C.'s (personal computers). For example, a first P.C. may be positioned at a roll loading station. Bar code data carried on an end of the paper rolls could thus be scanned in via the bar code reader 38 coupled to this roll loading station P.C. for display thereon. Roll data may also be entered and edited manually from the keyboard of the roll loading station P.C. Further, the RHO hammer 40 that measures hardness of a paper roll can be coupled to the first P.C. as an input thereto to allow the roll hardness to be displayed on the roll loading station P.C. This first P.C. would then transfer the data entered thereto to a second P.C. This second P.C. could be positioned at any other desirable point along the length of the press so as to provide a primary display for advising the main operator of the press as to the various press operations. The data from a number of sensors positioned along the length of the press, as described in detail below, may be input to the second P.C. via the data interface/configurator 34. Such sensors may include tension sensors, temperature sensors, speed sensors, edge crack detectors, hole detectors, as well as a device for measuring the diameter of the roll as the paper is being removed therefrom and run through the press.

As shown in FIG. 1 for the P.C. 26, the second press station P.C. or main P.C. stores the system software in a memory 42. A microprocessor 44 operates in accordance with a roll record software routine stored in the memory 42 and depicted in FIG. 2 to receive, store, and display roll record card data for each paper roll run on the press. The microprocessor 44 also operates in accordance with a set-up advisor routine depicted in FIG. 3 to provide the press operator with specific information and recommendations for setting press operating levels such as tension levels in order to minimize breaks in the paper web for a particular grade of paper, particular press or type thereof, and specific roll data input to the station 10. These recommendations may be based on a data base table of tension values that are correlated with a particular supplier's grade of paper on a particular press. Alternatively, as discussed in detail below, the recommendations provided by the press set-up advisor may be based upon an inference engine's evaluation of input data symptoms representing characteristics of the paper and press with historical data symptoms utilizing a symptom table, a conclusion table, and a symptom/conclusion table, as discussed in detail below with reference to FIGS. 6–8.

After the press has been set up for operation utilizing the set-up advisor routine, the operation of the press may begin. The microprocessor 44 monitors the press operations utilizing a monitor routine as discussed in detail below with reference to FIG. 4. The monitor routine monitors and displays information to the operator relating to real time tension values, tension history data, speed, roll diameter, edge crack data, ink temperature, paster cycle operation data, and data representing breaks in the paper web. The microprocessor 44, operating in accordance with the monitor routine, calls a defect advisor routine in response to the detection of the occurrence of one of a number of events so as to advise the operator of potential problems, actual problems, and the causes thereof.

The defect advisor routine is preferably an inference engine which utilizes a symptom table, a conclusion table, and a symptom/conclusion table to advise the operator as to the likelihood that a particular type of problem has occurred or is likely to occur and further advises the operator as to the most likely cause of the problem. The symptom table utilized by the defect advisor stores information identifying characteristics of a paper roll and one or more types of presses. The conclusion table stores information identifying a number of types of defects and/or the cause of such defects. A confidence level factor is stored in association with the defects in the conclusion table wherein the confidence level factor represents the system's confidence that the associated defect will occur or has occurred. The confidence level factor is dynamically changing as the press station 10 collects more and more data representing input data symptoms of the press operation. The symptom/conclusion table correlates the symptoms identified in the symptom table with conclusions identified in the conclusion table based on one of a number of relationships, as described in detail with reference to FIGS. 21–26. Given a particular set of symptoms, the symptom/conclusion table determines the likelihood that a particular event was caused by a particular symptom, i.e., occurrence in the system.

Figure 2:
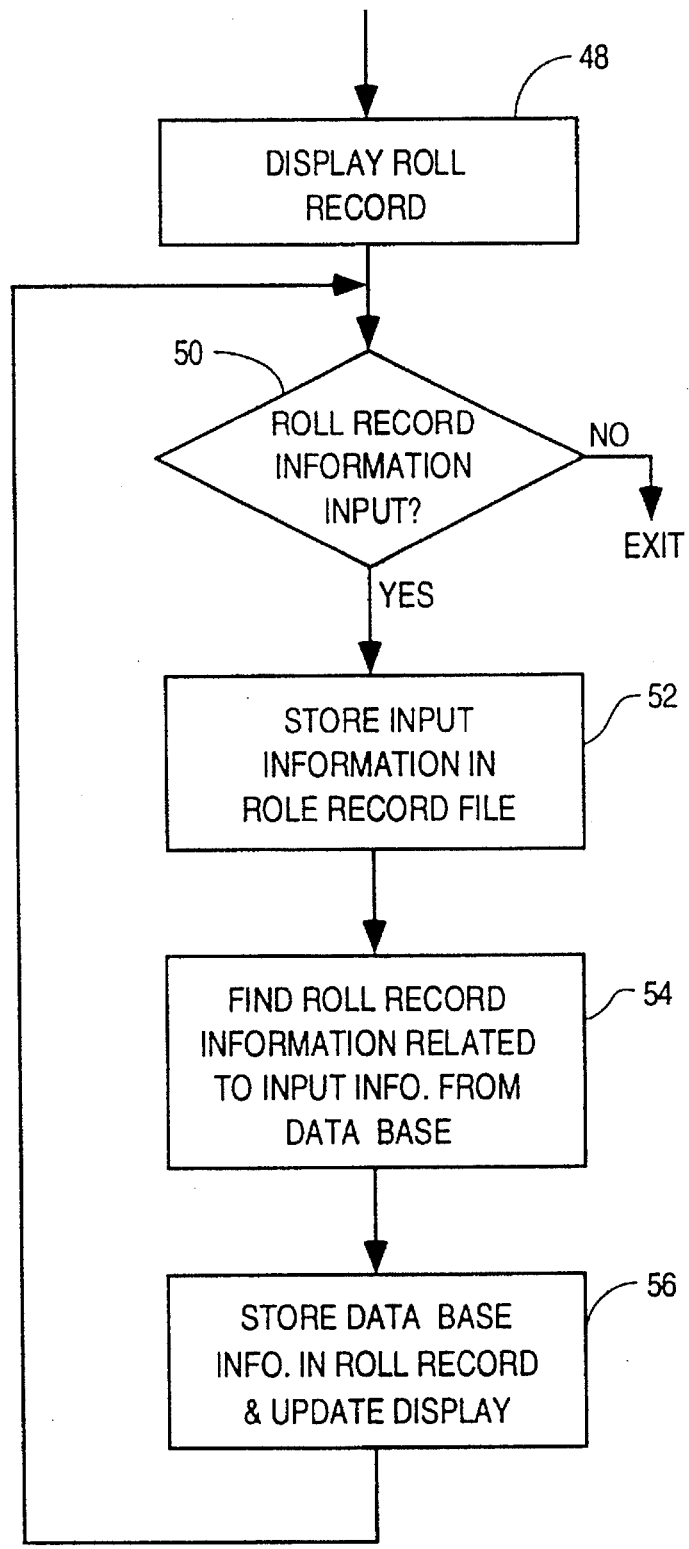
FIG. 2 is a flow chart of a Roll Record software subroutine implemented by the system depicted in FIG. 1.

As shown in FIG. 2, at the start of the roll record routine, the microprocessor displays, via the display 28, a roll record card screen depicted in FIG. 9. As roll record information from the paper roll being loaded onto the press is input, as determined by the microprocessor 44 at block 50, the microprocessor 44 stores the input information in a roll record card file at block 52. At block 54, the microprocessor 44 finds roll record information related to the input information from the data base of the memory 42 and/or the memory 24 of the master station 12. The input information and information obtained from the data bases of the system, are then displayed by the microprocessor 44 at block 56 on the roll record card screen of FIG. 9. During the operation of the press on a roll of paper, the roll record card file associated with that particular roll of paper is continuously being updated with information such as depicted by the display screen illustrated in FIG. 10, including information relating to breaks that have occurred in the roll. The information initially stored in the roll record file card forms a first set of symptoms on which the inference engine software routines of the system operate. The inference engine evaluates these initial symptoms to shorten and prioritize the list of possible defects which are likely to occur during the press's operation on that particular roll of paper. After the roll record routine is implemented, the set-up advisor routine may be implemented to advise the operator as to various recommended press operating levels that are to be set for the particular roll of paper and the particular press in order to minimize web breaks.

Figure 3:
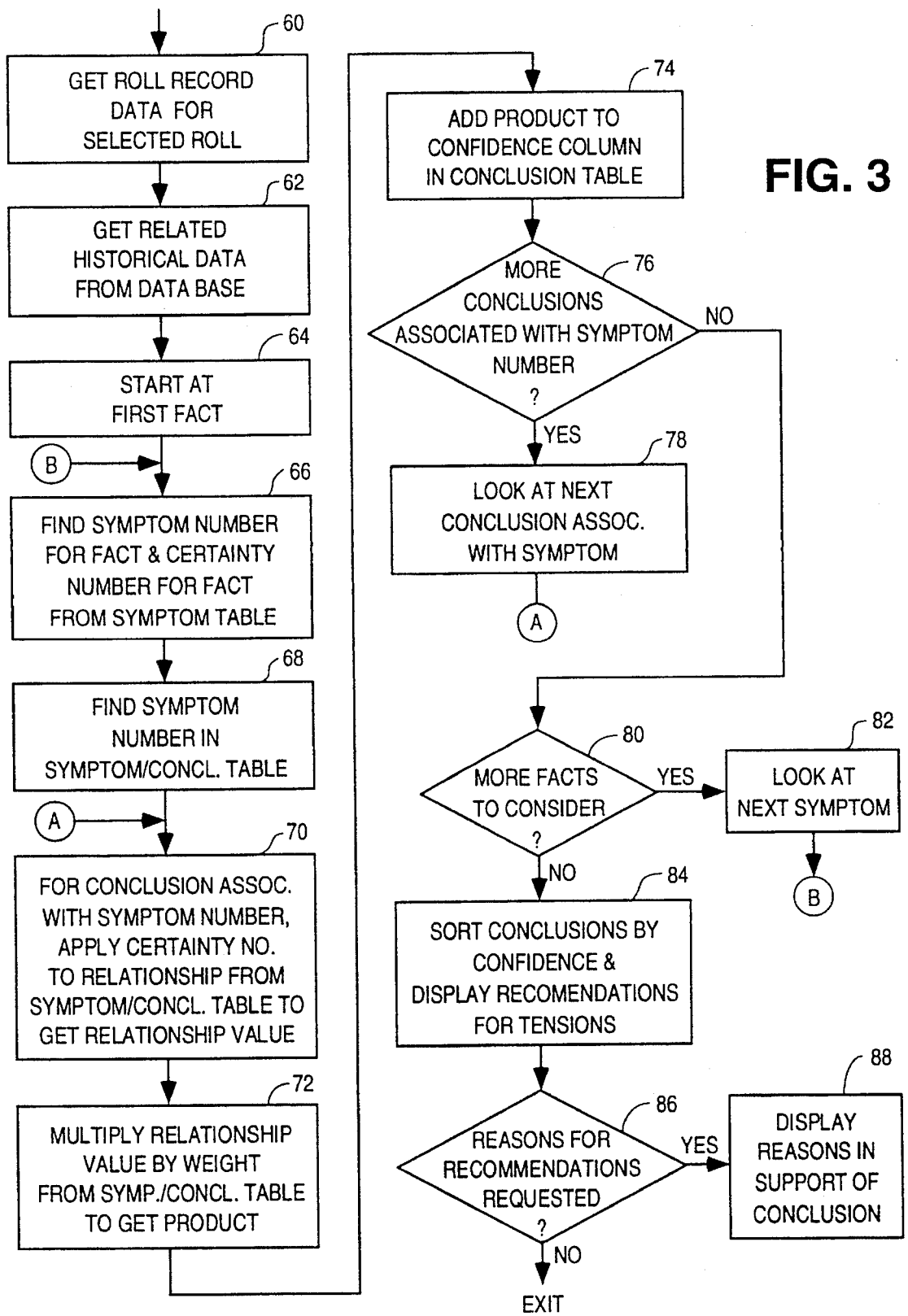
FIG. 3 is a flow chart illustrating a Set Up Advisor software subroutine implemented by the system depicted in FIG. 1.

At the start of the set-up advisor routine depicted in FIG. 3, the microprocessor 44 at a block 60 retrieves the roll record data from the roll record card file associated with the paper roll loaded onto the printing press. At a block 62, the microprocessor 44 retrieves related historical data from the data base of the memory 42 of the system 10 and/or from the data base of the memory 24 of the master station 12. The retrieved historical data may include data gathered from the operation of the specific press being monitored; data gathered from the operation of similar presses; data gathered from previously run paper rolls received from the same supplier as the supplier of the paper roll being run and of the same grade as the grade of the paper roll being run, etc. The retrieved data forms a set of symptoms, or facts, which are evaluated by the microprocessor 44 in accordance with the set-up advisor routine to allow the microprocessor 44 to recommend press operation levels to be set, such as press tension levels. The microprocessor 44, in accordance with the set-up advisor routine, may also make recommendations as to various other press operation settings such as the temperature of the ink, the ratio of ink-to-ink solvent utilized; etc. Based on the symptoms or facts gathered at steps 60 and 62, the microprocessor 44 determines preferred press-operation settings based on a data base table of particular press operation setting values that correlate a particular press with a particular supplier's grade of paper, etc. Alternatively, the microprocessor 44 determines the values of the press operation settings to recommend to the operator utilizing an inference engine, which, as further depicted in FIG. 3, is an intelligent system that evaluates a set of rules applied to input data and historical data utilizing a symptom table, a conclusion table, and a symptom/conclusion table.

An example of the symptom table utilized by the microprocessor in implementing the set-up advisor routine is depicted in FIG. 6. As shown therein, the symptom table 90 stores information for each of a number of symptoms or facts, including a symptom number associated with the fact; a brief description of the fact; a full description of the fact; a certainty factor associated with the fact; low and high values associated with the fact; the identity of the variable for which the low and/or high values are specified; an operator such as "equal to", "greater than", or "less than"; a yes or no answer to a symptom question; a string answer; or a numerical answer. It is noted, that depending on the particular symptom or fact, there need not be an input in each of the columns for the particular fact. An example of a symptom stored in the table 90 may be as follows: "2039 the basis weight is between 20 and 30 pounds". For this example, the symptom number would be represented by 2039. The low value specified in column 92 would be 20, whereas the high value specified in column 92 would be 30. The variable specified in column 94 would be basis weight and the operators specified in column 96 would be the "greater than" symbol and the "less than" symbol. It is noted that each of the symptoms may actually represent questions relating to facts. If so, the symptom would be interpreted as the question—Is the basis weight of the paper between 20 and 30 pounds? For this example the type of answer expected would be stored in column 98 as a yes or a no. If an alpha-string answer is expected, the string would be stored in column 100, and if a numeric answer is expected, it would be stored in a column 102. The certainty factor inserted in column 104 may be user entered or automatically determined by the system.

An example of a conclusion table is illustrated in FIG. 7. As shown therein, the conclusion table stores information for each conclusion, including a conclusion number; the name of the defect or press operation setting associated with the conclusion number; a confidence factor; a key symptom that summarizes all of the classic symptoms necessary to completely substantiate a particular conclusion; the cause of a defect conclusion; and the family of defects to which a defect conclusion belongs. The confidence factor associated with a particular conclusion is continuously being updated as symptoms related to the conclusion are discerned by the system. Further, the confidence factor associated with a particular conclusion is determined by the weight and relationship set out in the symptom/conclusion table, as discussed below.

An example of a symptom/conclusion table is illustrated in FIG. 8. As shown therein, the symptom/conclusion table includes information identifying each conclusion number stored in the conclusion table of FIG. 7; one of a number of relationships relating the conclusion set out in column 104 with the symptom specified in column 106; an explanation of why the symptom set out in column 106 is relevant to the conclusion set out in column 104; and in column 108, a weight which represents the certainty of the relationship of the symptom to the conclusion. For example, if there is some question about whether a symptom is related to a particular conclusion according to the specified relationship, the weight set out in column 108 will be relatively low. However, if the symptom is definitely related to a particular conclusion according to the specified relationship, the weight set out in column 108 will be high.

Figure 21:
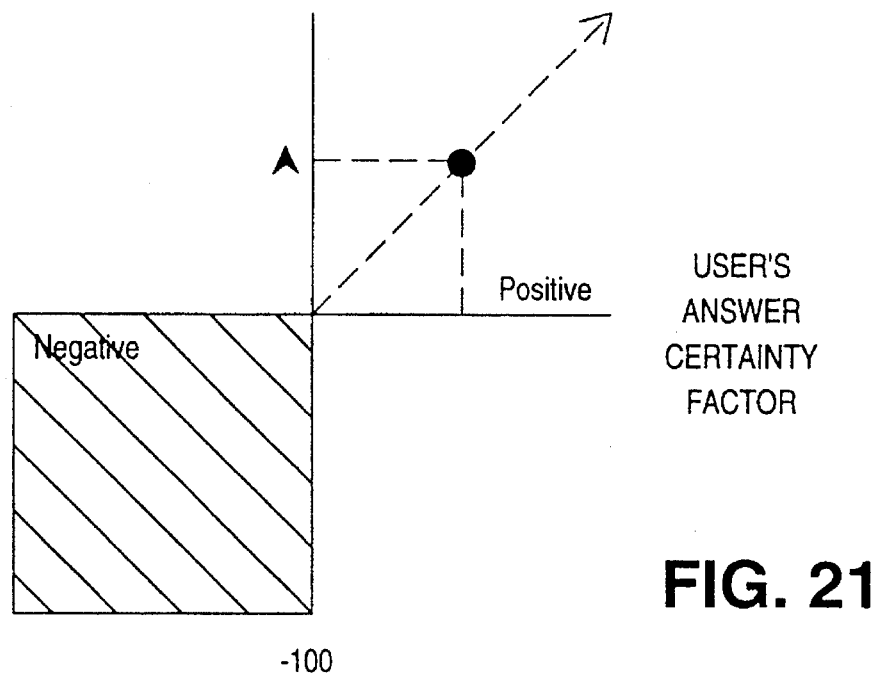
FIG. 21 is a graph illustrating a REQUIRED relationship stored in the system/conclusion table of FIG. 8.
Figure 22:
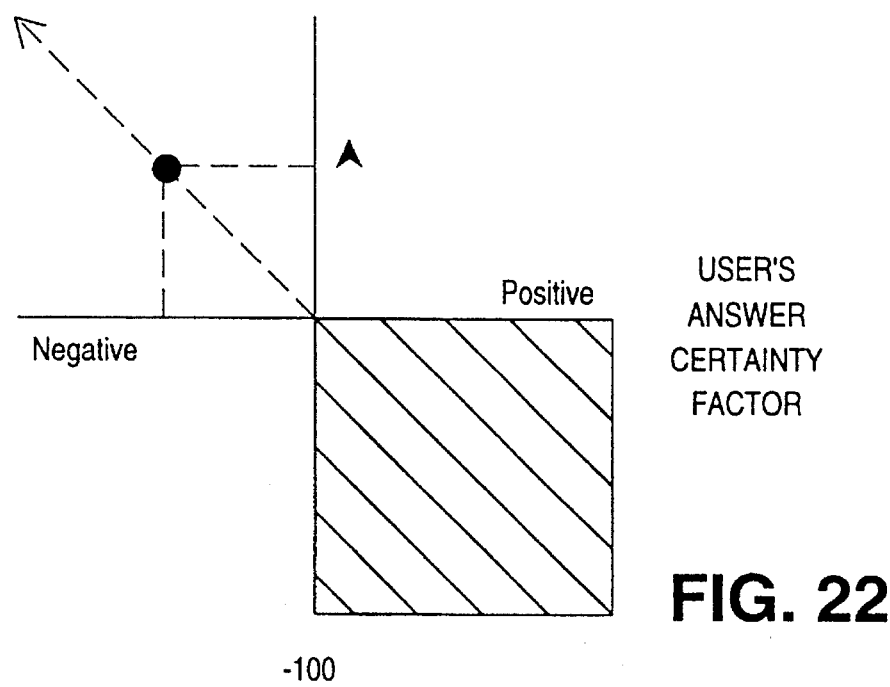
FIG. 22 is a graph illustrating a PRECLUDES relationship stored in the symptom/conclusion table of FIG. 8.
Figure 23:
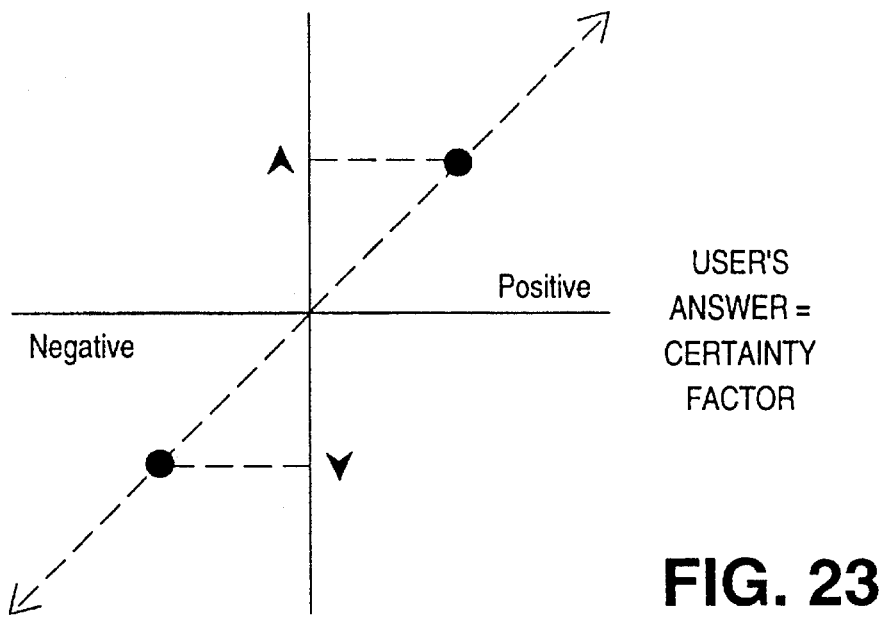
FIG. 23 is a graph illustrating an IMPLIES relationship stored in the symptom/conclusion table of FIG. 8.
Figure 24:
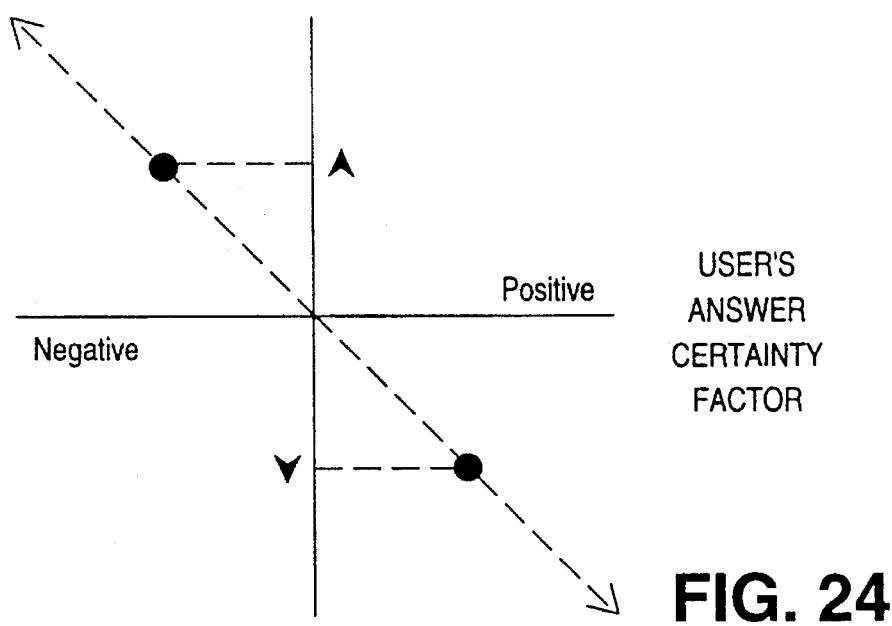
FIG. 24 is a graph illustrating a NEGATES relationship stored in the symptom/conclusion table of FIG. 8.
Figure 25:
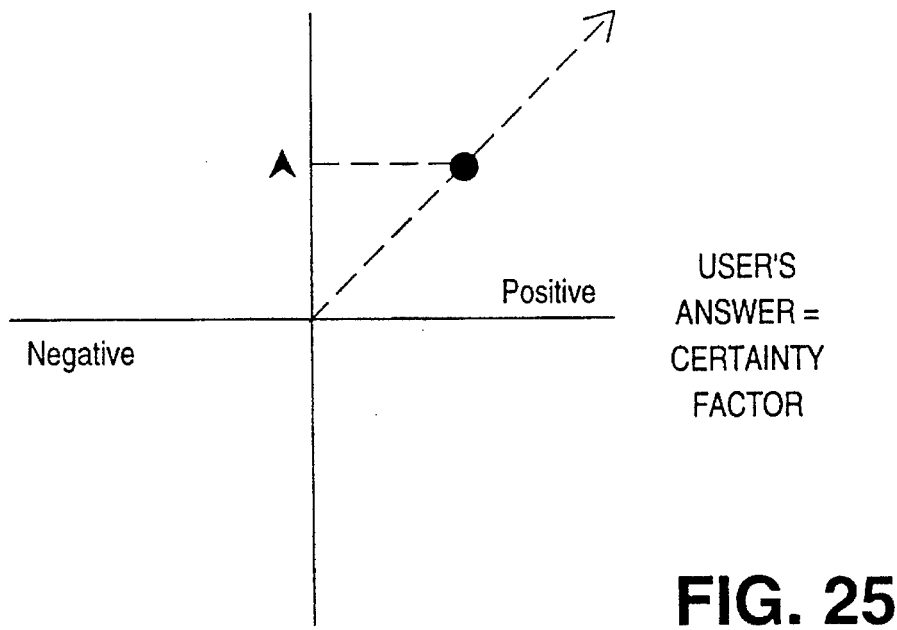
FIG. 25 is a graph illustrating a RULES IN relationship stored in the symptom/conclusion table of FIG. 8.
Figure 26:
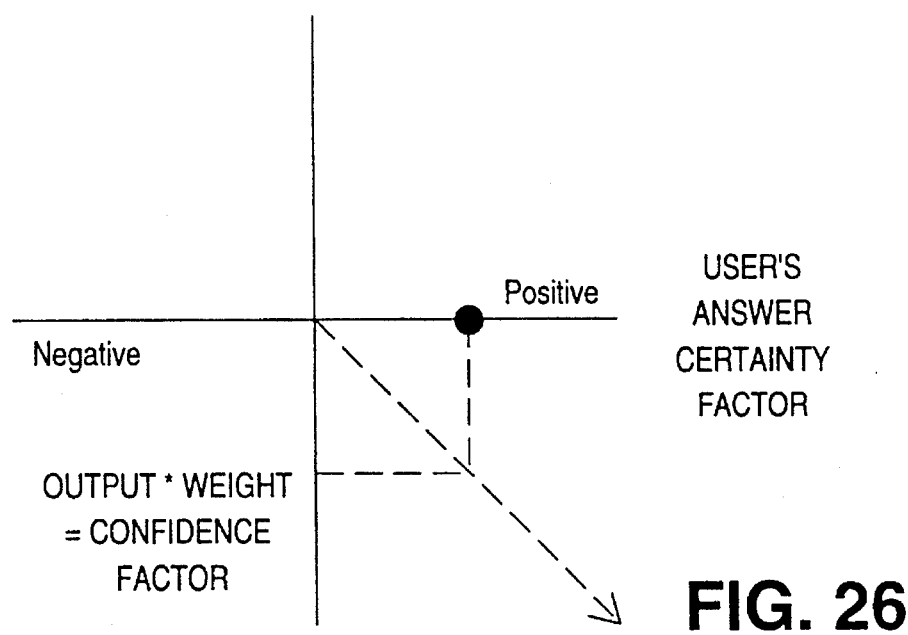
FIG. 26 is a graph illustrating a RULES OUT relationship stored in the symptom/conclusion table of FIG. 8.

The relationships that are set out in column 110 of the symptom/conclusion table may be one of the known relationships depicted in FIGS. 21–26, for example. FIG. 21 represents the REQUIRED relationship. For this relationship, a positive answer supports a conclusion, whereas a negative answer eliminates the conclusion. For example, when a particular symptom is "required" for a particular conclusion, if that symptom is not a member of the symptom set upon which the inference engine is operating, then that particular conclusion is eliminated from the set of possible conclusions. FIG. 22 illustrates the PRECLUDES relationship. This relationship is such that a positive answer eliminates the conclusion from any further consideration, whereas a negative answer supports the conclusion. FIG. 23 illustrates the IMPLIES relationship, wherein a positive answer supports a conclusion, whereas a negative answer reduces a conclusion but does not eliminate it. FIG. 24 illustrates the NEGATES relationship. This relationship is the inverse of the IMPLIES relationship and is such that a positive answer reduces a conclusion, whereas a negative answer supports a conclusion. FIG. 25 illustrates the RULES IN relationship, wherein a positive answer supports a conclusion and there is no effect from a negative answer. The RULES OUT relationship depicted in FIG. 26 is such that a positive answer reduces a conclusion, whereas there is no effect from a negative answer.

Returning to FIG. 3, after the microprocessor 44 retrieves the facts or symptoms to be evaluated at blocks 60 and 62, the microprocessor sets a pointer to the first fact of the retrieved set at block 64. Thereafter, at a block 66 the microprocessor 44 finds the symptom number associated with that particular fact from the symptom table 90. The microprocessor 44 also retrieves the certainty factor for the particular symptom from the symptom table at block 66. The microprocessor at block 68 then locates each occurrence of the symptom number found at block 66 in the symptom\conclusion table 120. For the first conclusion found in association with the symptom number at block 68, the microprocessor 44 at blocks 70, 72, and 74 determines the confidence factor by implementing the known equation: certainty factor x weight=confidence factor. More particularly, the microprocessor 44 at block 70 applies the certainty factor from the symptom table 90 to the relationship identified in column 10 of the symptom/conclusion table to obtain a relationship value. Thereafter, at block 72, the microprocessor 44 multiplies the relationship value obtained at block 70 by the weight from the symptom/conclusion table to get a product. This product is added by the microprocessor 44 at block 74 to the value stored in the confidence factor column 122 of the conclusion table to update the confidence factor associated with the particular conclusion. Thereafter, the microprocessor 44 determines at a block 76 if there is another conclusion associated with the symptom number found at block 66. If so, the microprocessor proceeds to block 78 to look at the next conclusion associated with that particular system and returns to block 70. After each conclusion that is related to the symptom number found at block 66 has been analyzed, the microprocessor proceeds from block 76 to block 80 to determine whether there are more facts, i.e. symptoms, to be considered. If so, the microprocessor increments to the next symptom or fact in the set of facts at block 82 and returns to block 66. After each symptom has been considered, the microprocessor proceeds from block 80 to block 84 to sort the conclusions from highest to lowest by confidence factor. At block 84, the microprocessor 44 also displays its recommendations for the various press operation setting levels such as tension levels, as discussed below. At block 86, the microprocessor determines whether the user has requested the reasons for the recommendations and if so, the microprocessor proceeds to block 88 to display the reasons in support of the conclusions, i.e. recommendations for the particular press operation setting.

Figure 11:
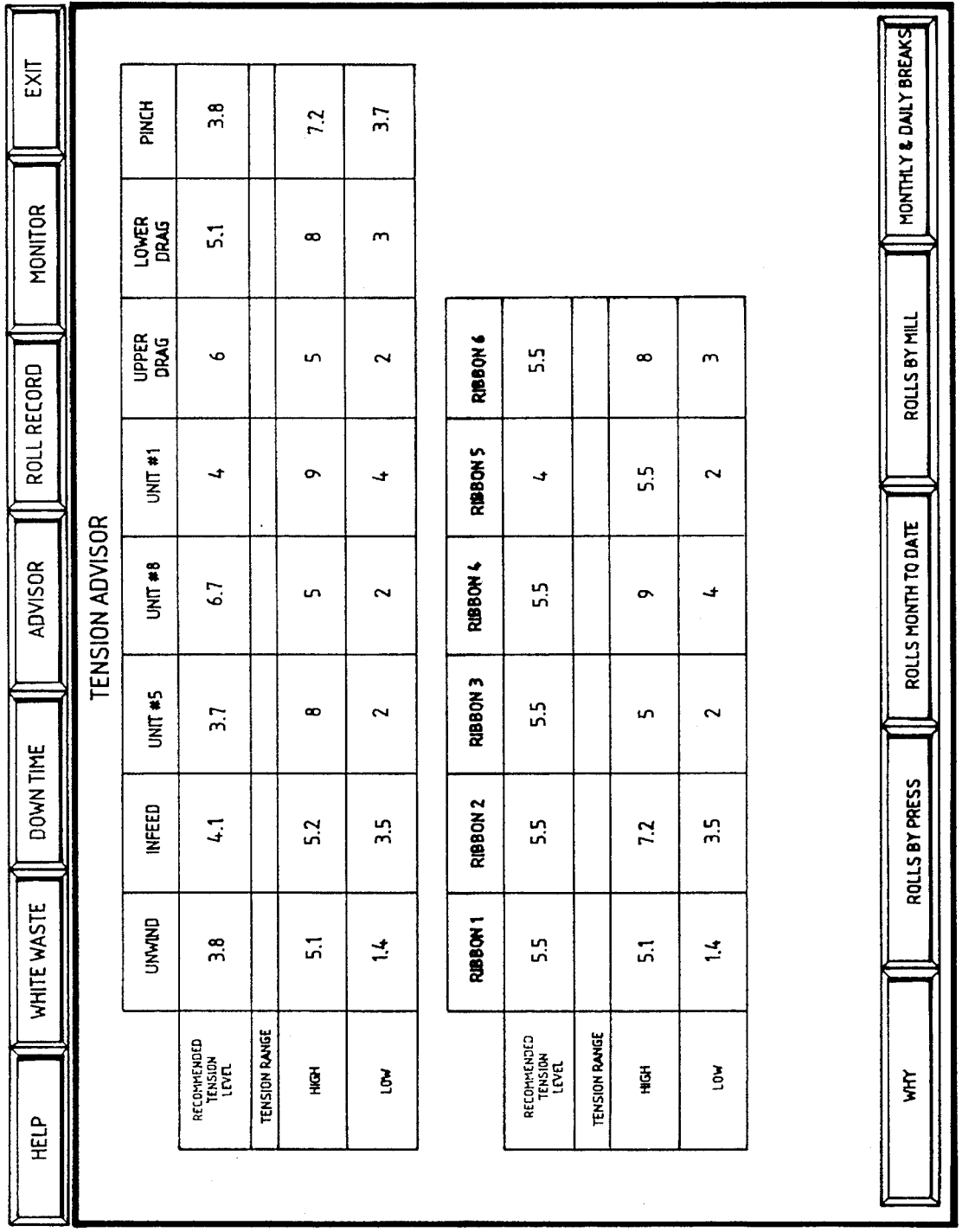
FIG. 11 is an illustration of a tension advisor screen displayed by the system of FIG. 1.
Figure 12:
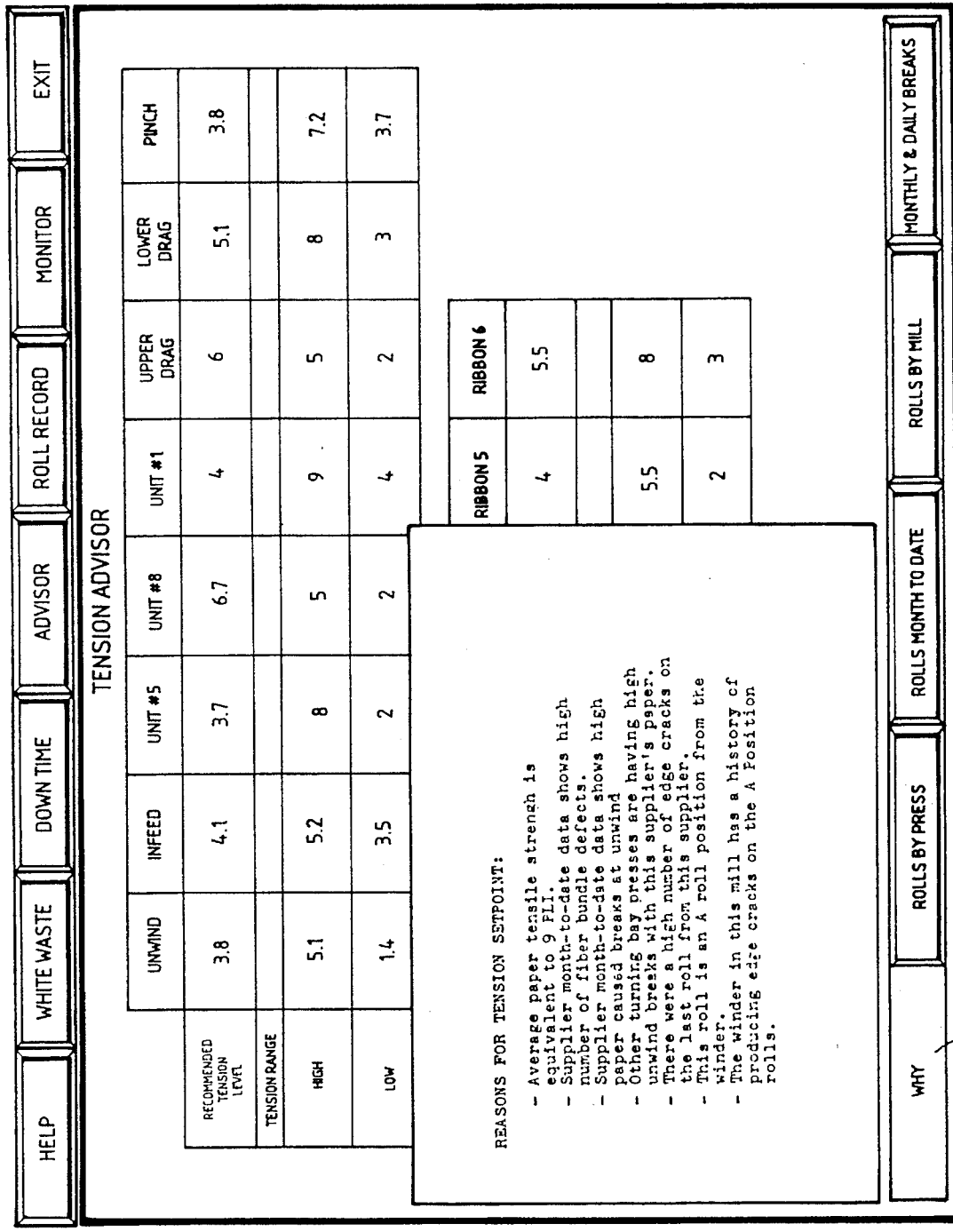
FIG. 12 is an illustration of the tension advisor screen depicted in FIG. 11 with a window illustrating the reasons for recommended tension set points.
Figure 13:
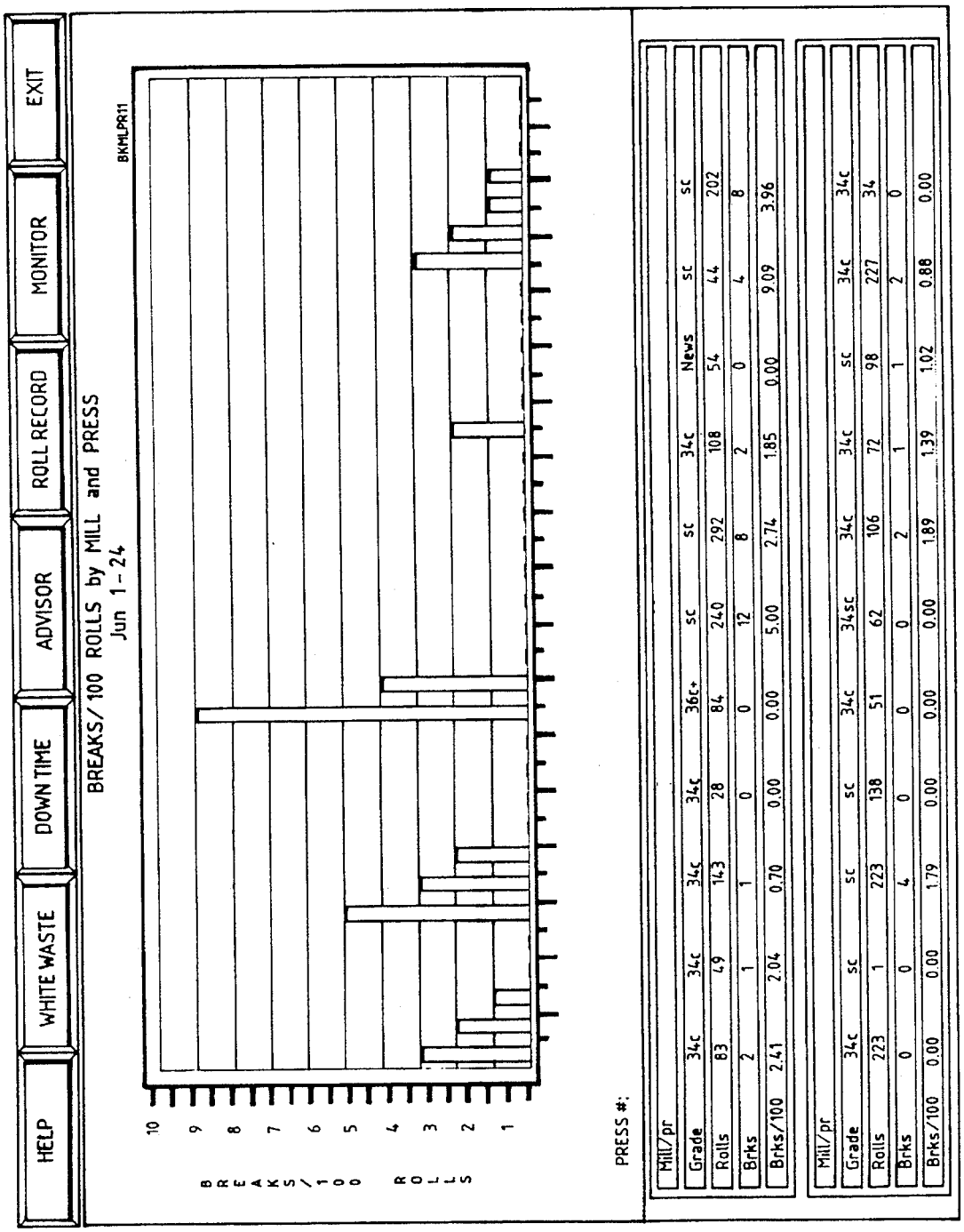
FIG. 13 is an illustration of a statistical graph screen displayed by the system of FIG. 1.
Figure 20:
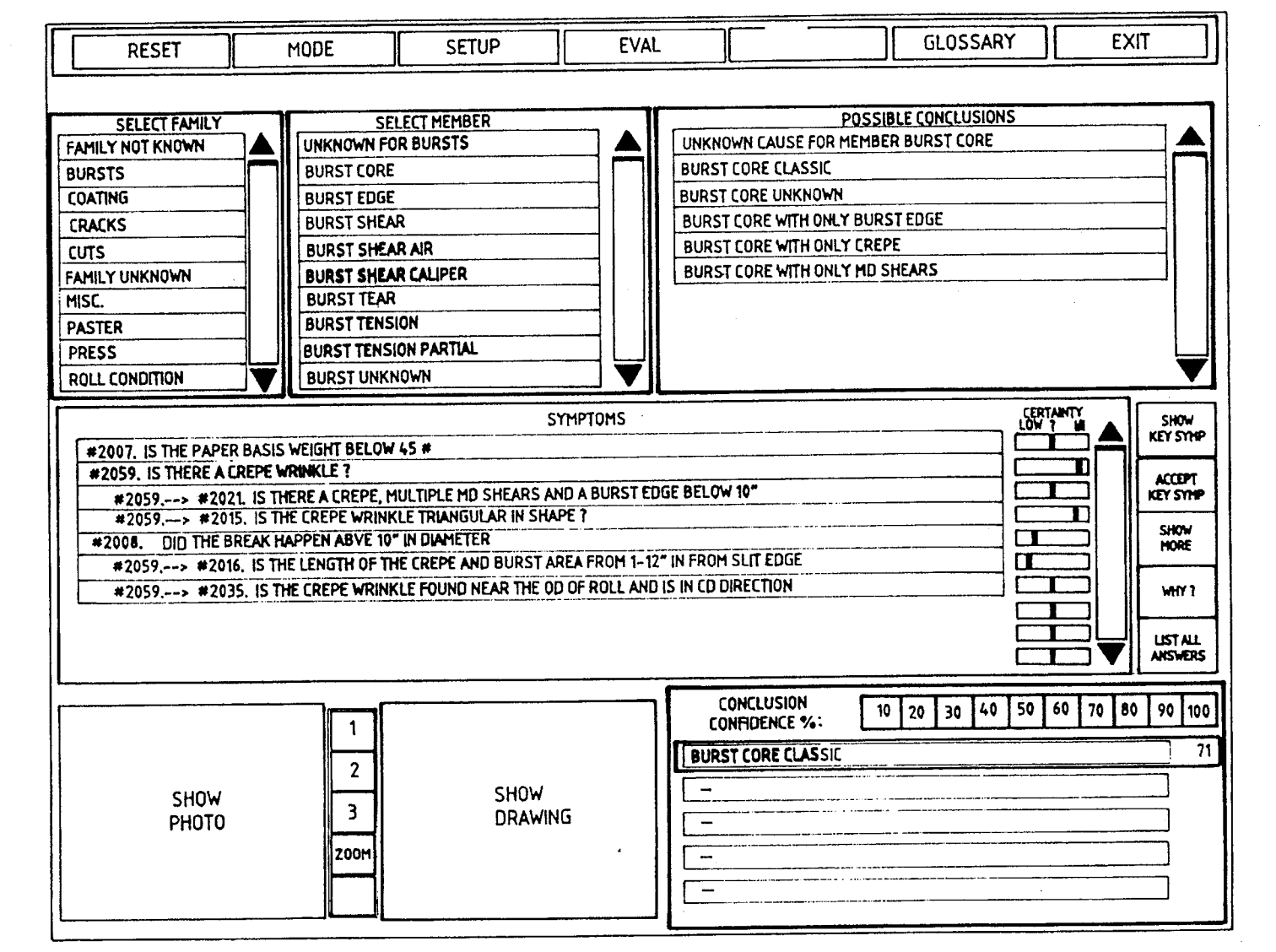

During the operation of the set-up advisor, the user may select various screens to be displayed on the display 28 for viewing. FIG. 11 illustrates an example of an advisor screen recommending tension values and ranges for each critical section of the press. FIG. 12 illustrates a window that is displayed overlapping the screen depicted in FIG. 11, when the WHY block 130 is selected by the user. This window presents a list of facts, i.e. symptoms that were used to determine the recommended set points via the operation of the intelligent set-up advisor routine depicted in FIG. 3. FIG. 20 is an example of a display screen illustrating the number of breaks in rolls by mill and press.

Figure 4:
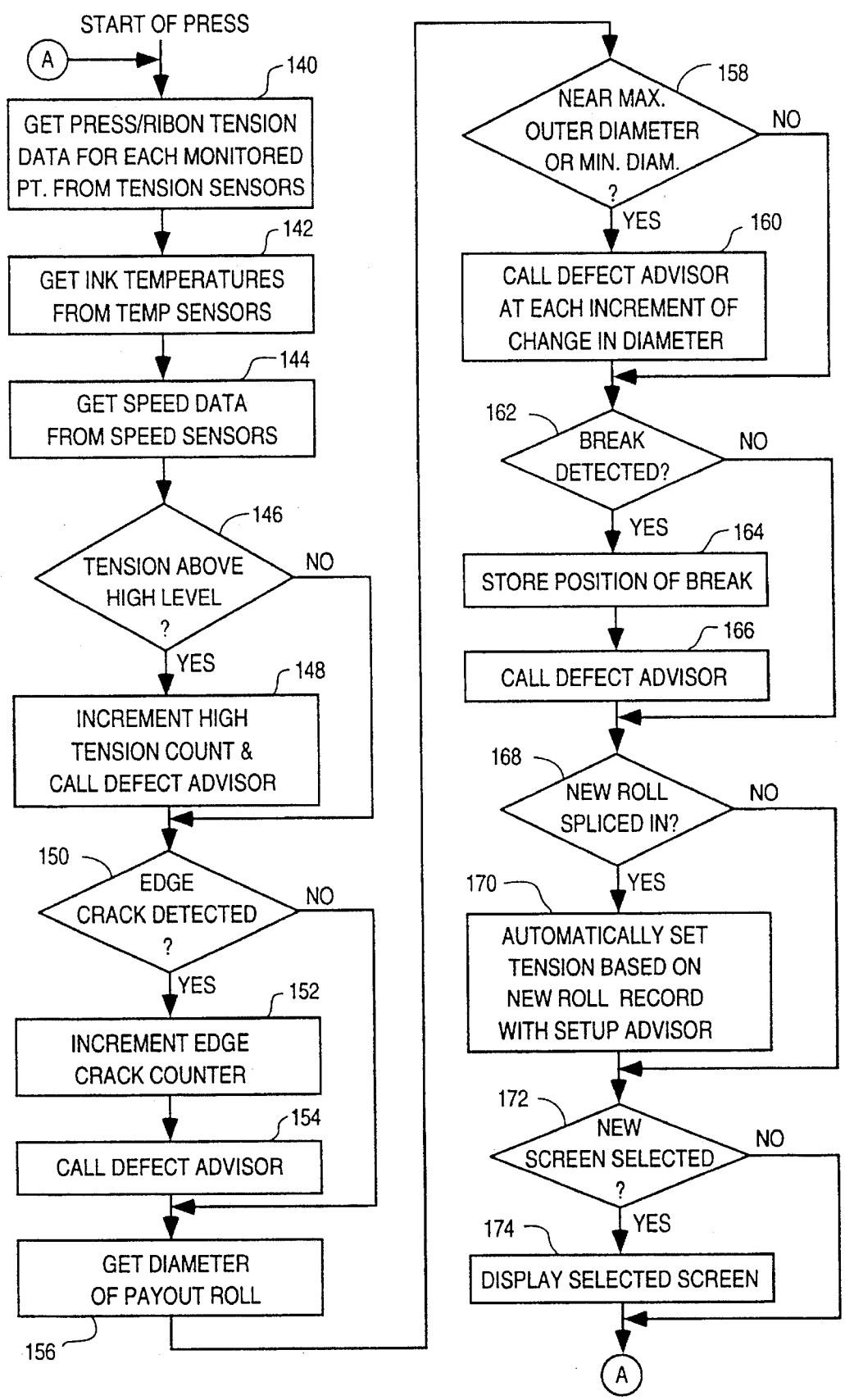
FIG. 4 is a flow chart illustrating a Monitor software subroutine implemented by the system depicted in FIG. 1.

The monitor routine implemented by the microprocessor 44 is depicted in FIG. 4. At the start of this routine the microprocessor at block 140 retrieves the press i.e., paper and ribbon tension data for each monitored point along the press from the various tension sensors. At block 142 the microprocessor retrieves the ink temperatures from the temperature sensors and at block 144 the microprocessor retrieves the speed data from the speed sensors. Thereafter, the microprocessor 44 determines at a block 146 whether any of the tension levels obtained from the tension sensors are above a respective high level associated with that particular tension sensor. If so, the microprocessor 44 increments at block 148 a high tension counter and calls the defect advisor routine depicted in FIG. 5. From blocks 146 or 148 the microprocessor proceeds to block 150 to determine whether an edge crack has been detected in the paper being run on the press. If not, the microprocessor proceeds to block 156. If, however, an edge crack has been detected, the microprocessor proceeds to block 152 to increment an edge crack counter. Thereafter, at a block 154 the microprocessor 44 calls the defect routine depicted in FIG. 5. At block 156, the microprocessor retrieves the diameter of the roll of paper being payed out into the press. Thereafter, the microprocessor 44 at a block 158 determines whether the diameter is near the maximum outer diameter for a roll or near the minimum inner diameter for a roll. If not, the microprocessor proceeds directly to block 162 from 158. However, if the diameter retrieved at block 156 indicates that the paper roll is just starting to be run through the press, or is close to being depleted, the microprocessor proceeds to block 160 to call the defect advisor routine of FIG. 5 at each increment of change in the diameter. At block 162 the microprocessor determines whether a break in the paper has been detected. If so, the microprocessor at block 164 stores the press position at which the break occurred, and at block 166 the microprocessor 44 calls the defect advisor routine of FIG. 5. At block 168 the microprocessor 44 then determines whether a new roll of paper has been spliced in or not and, if so, the microprocessor proceeds to block 170. At block 170, the microprocessor 44 automatically sets tension levels based on the roll record card file associated with the new roll in accordance with the set-up advisor routine depicted in FIG. 3. Thereafter, at block 172 the microprocessor determines whether a new screen has been selected for display on the display 28 and, if so, the microprocessor at block 174 displays the selected screen.

Figure 14:
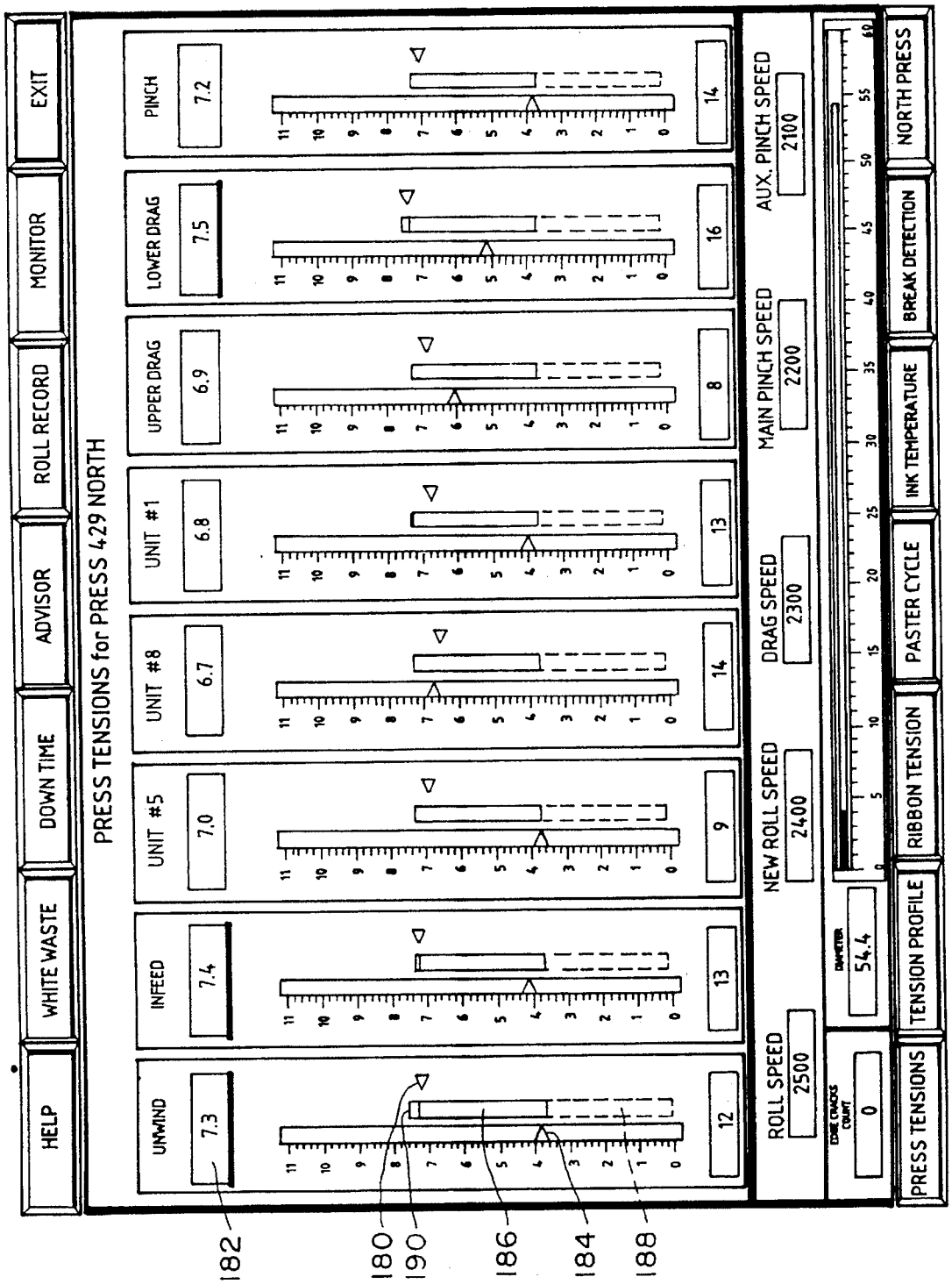
FIG. 14 is an illustration of a press tension monitoring screen displayed by the system of FIG. 1.

FIG. 14 illustrates a press tension monitoring screen displayed by the microprocessor 44 for a particular press. The location of the tension sensors providing input data is illustrated for the unwind press section, the infeed press section, unit number 5 of the press, unit number 8 of the press, unit number 1 of the press, the upper drag section, the lower drag section, and the pinch section. Each measured tension level is indicated by a respective triangle 180 located on the right side of a vertical scale for an associated tension sensor. The triangle 180 representing sensed tension moves in real time in accordance with the data collected from the identified sensor. A digital value representing the real time tension data is depicted in a box 182. A reference arrow 184 shows the target tension level recommended by the set-up advisor routine. A middle bar 186 is preferably colored to indicate a range of allowable tensions. A different colored bar 188 illustrates tension levels below those that are recommended, whereas a bar 190 colored, for example red, and distinguishable from the bar 186, illustrates excursions into tension levels in excess of the highest tension levels recommended by the system so as to advise the operator as to potential problems.

Figure 15:
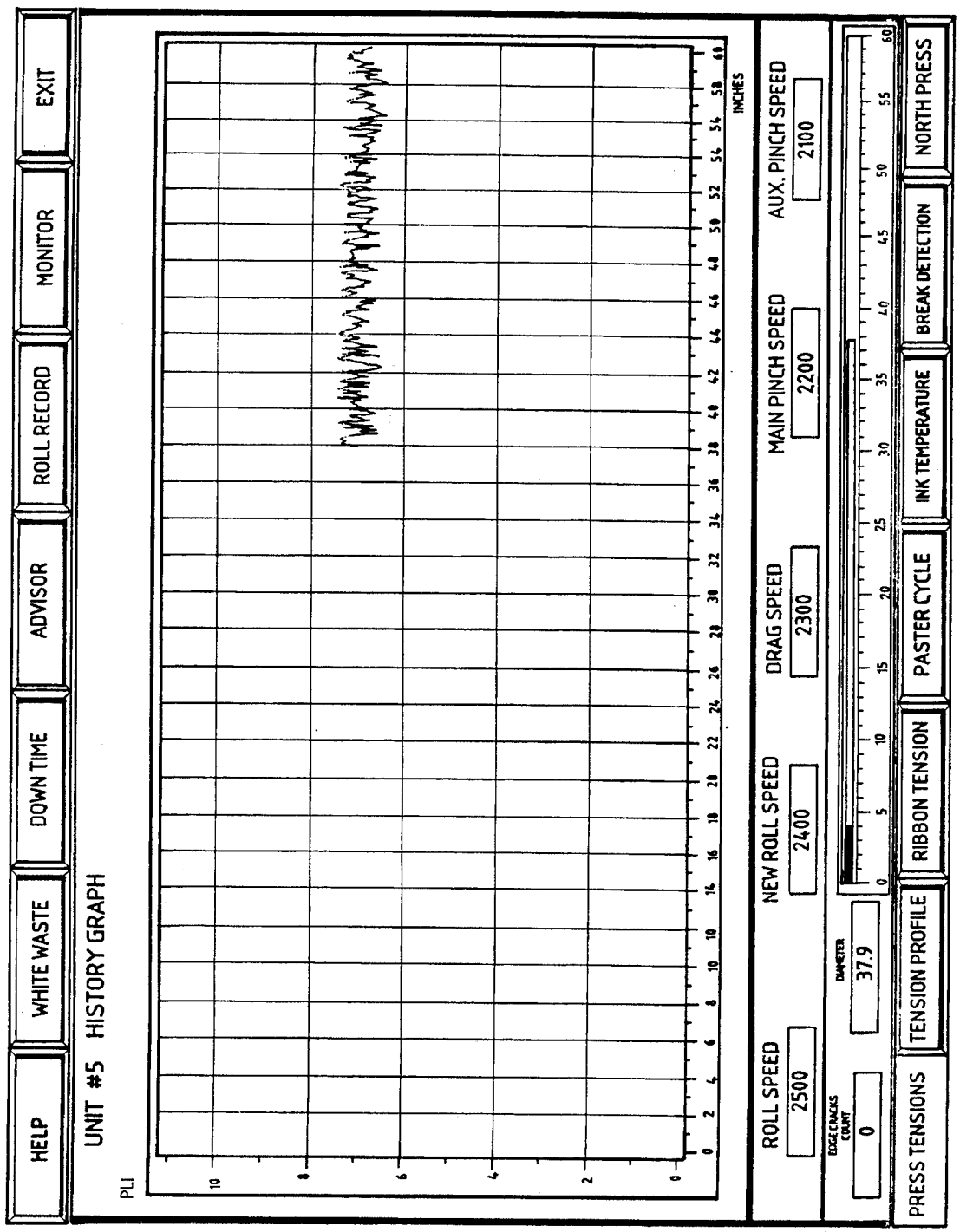
FIG. 15 is a graph of tension history since the start of a paper roll as displayed by the system of FIG. 1.

FIG. 15 is a graph that may be selected during the monitor routine, the graph illustrating the tension history obtained for a particular roll from the start of the roll on the press. The points in the graph above the recommended tension values appear in red, for example; whereas, the points of the graph within the recommended tension ranges will have the same color as the color of the bar 186 of FIG. 14. Measured tension values that are below the recommended levels will appear in FIG. 15 in the same color as the bar 188 of FIG. 14. The tension graphs of FIGS. 14 and 15 provide the operator with readily understandable information relating to a large amount of data.

Figure 16:
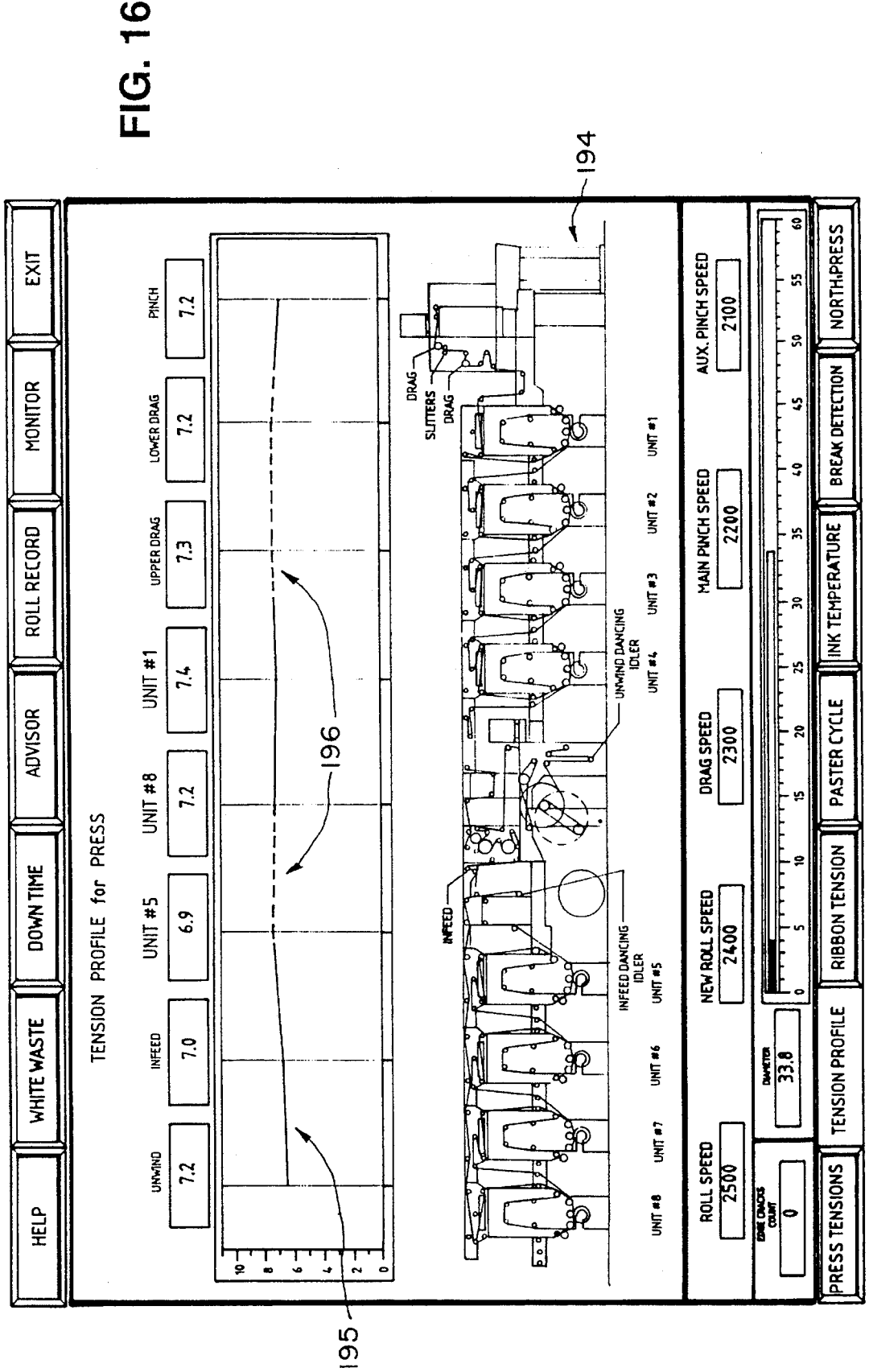
FIG. 16 is a tension profile screen illustrating tension levels throughout the press and displayed by the system depicted in FIG. 1.
Figure 17:
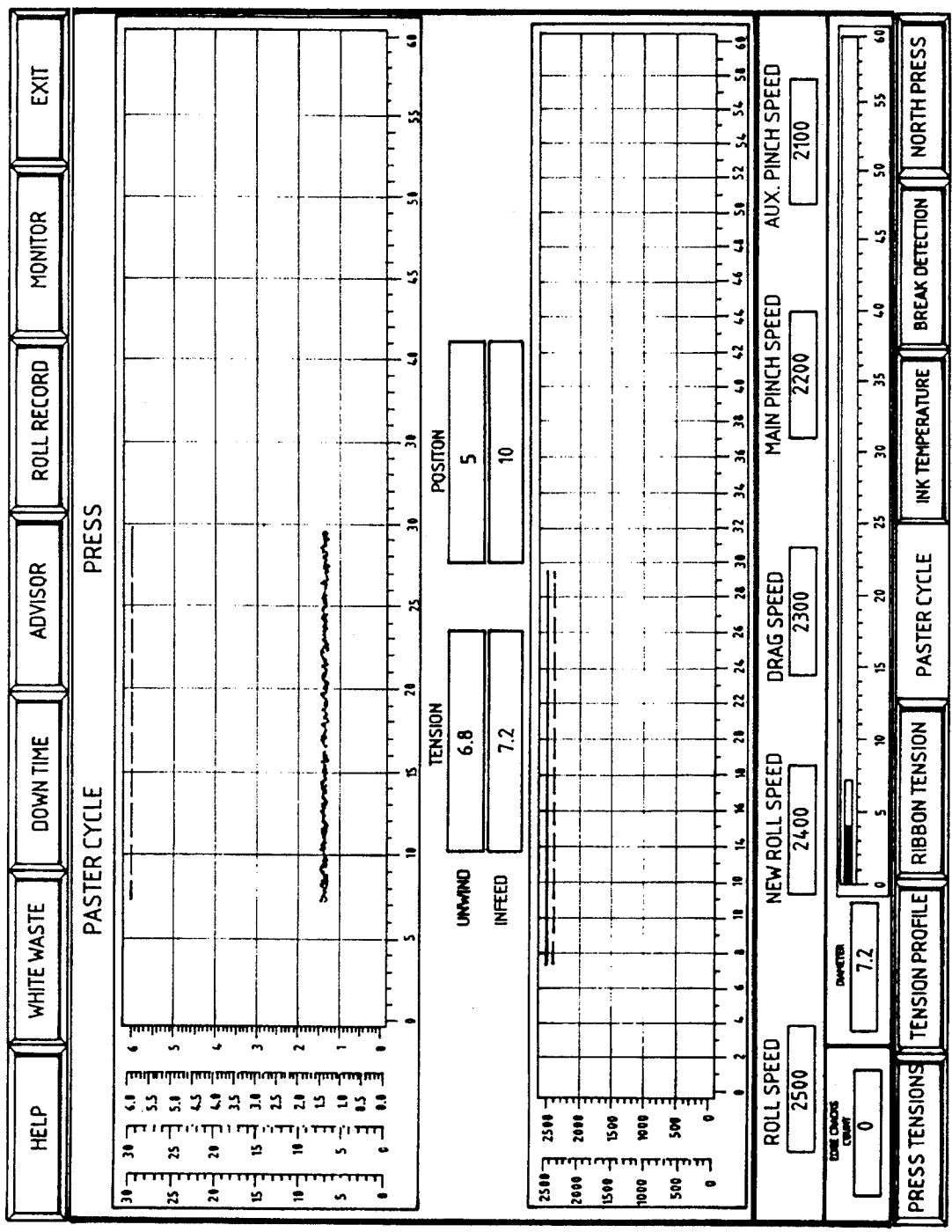
FIG. 17 is a paster cycle screen displayed by the system depicted in FIG. 1.
Figure 18:
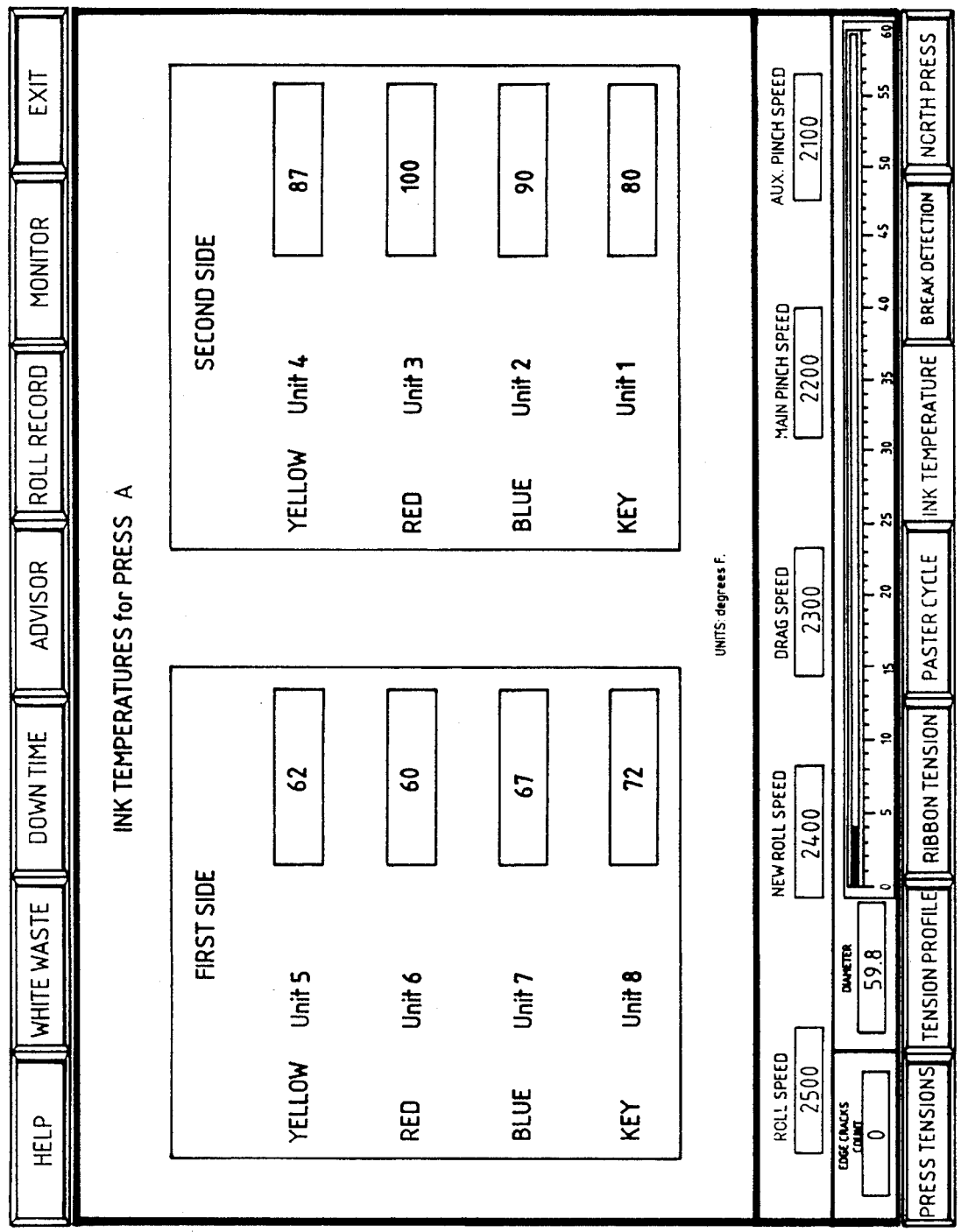
FIG. 18 is an ink temperature screen displayed by the system shown in FIG. 1.

FIG. 16 illustrates a tension profile screen that depicts all of the tension levels throughout the press. At 194, this screen depicts the type of press which is being monitored, as well as the location of the various tension sensors. The tension levels depicted at, for example, 195 which are within the recommended ranges will be displayed in one color; whereas tension levels which are detected to be above recommended values such as at 196 and represented by the dotted line are depicted in a different color such as red so as to easily alert the user to areas of potential problems in the press operation. In the screens depicted in FIGS. 14, 15, and 16, the speeds of the paper at critical locations along the press and the current roll diameter are displayed and continuously updated. Also displayed is a counter which indicates the cumulative number of edge cracks detected. FIG. 17 illustrates dancer roll positions and tension levels for the unwind and infeed sections of the press during the paster cycle, since this cycle is very critical in the press operation. The unwinding roll speed and new roll speed are also displayed in FIG. 17. FIG. 18 illustrates a screen that displays ink temperatures as digital readouts. These temperatures may be displayed in degrees Fahrenheit or degrees Celsius.

Figure 19:
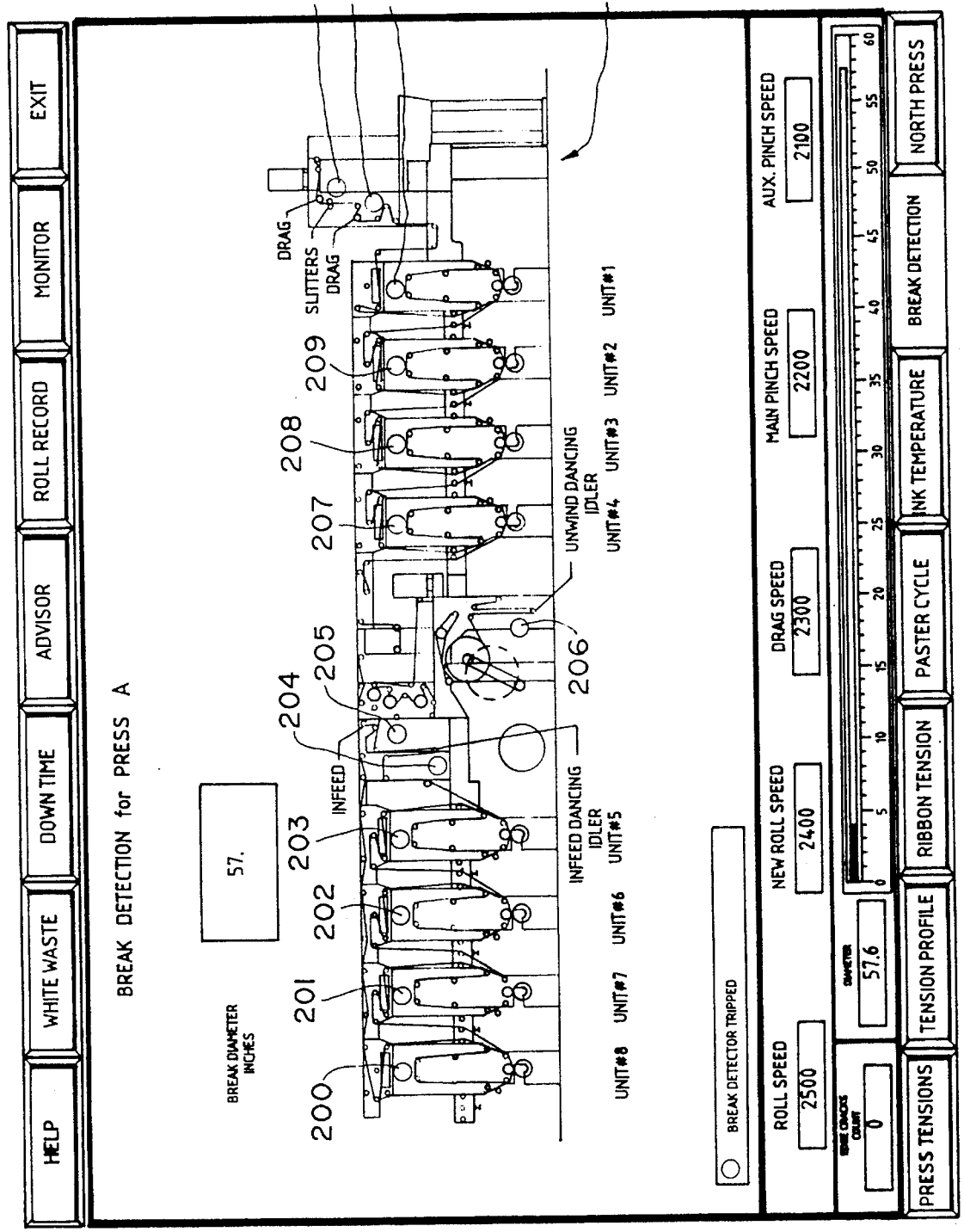
FIG. 19 is an illustration of a break detection screen displayed by the system of FIG. 1.

In the event that a break in the paper web is detected during the operation of the monitor routine, a break detection screen, as shown in FIG. 19, may be displayed. The position of break indicators 200–212 are indicated by the illustration of the press at 214 of the screen, wherein the break indicators will turn from green to red as the respective break detection sensor on the machine detects a missing web. As the missing web advances along the machine, the break indicators sequentially change color.

Figure 5:
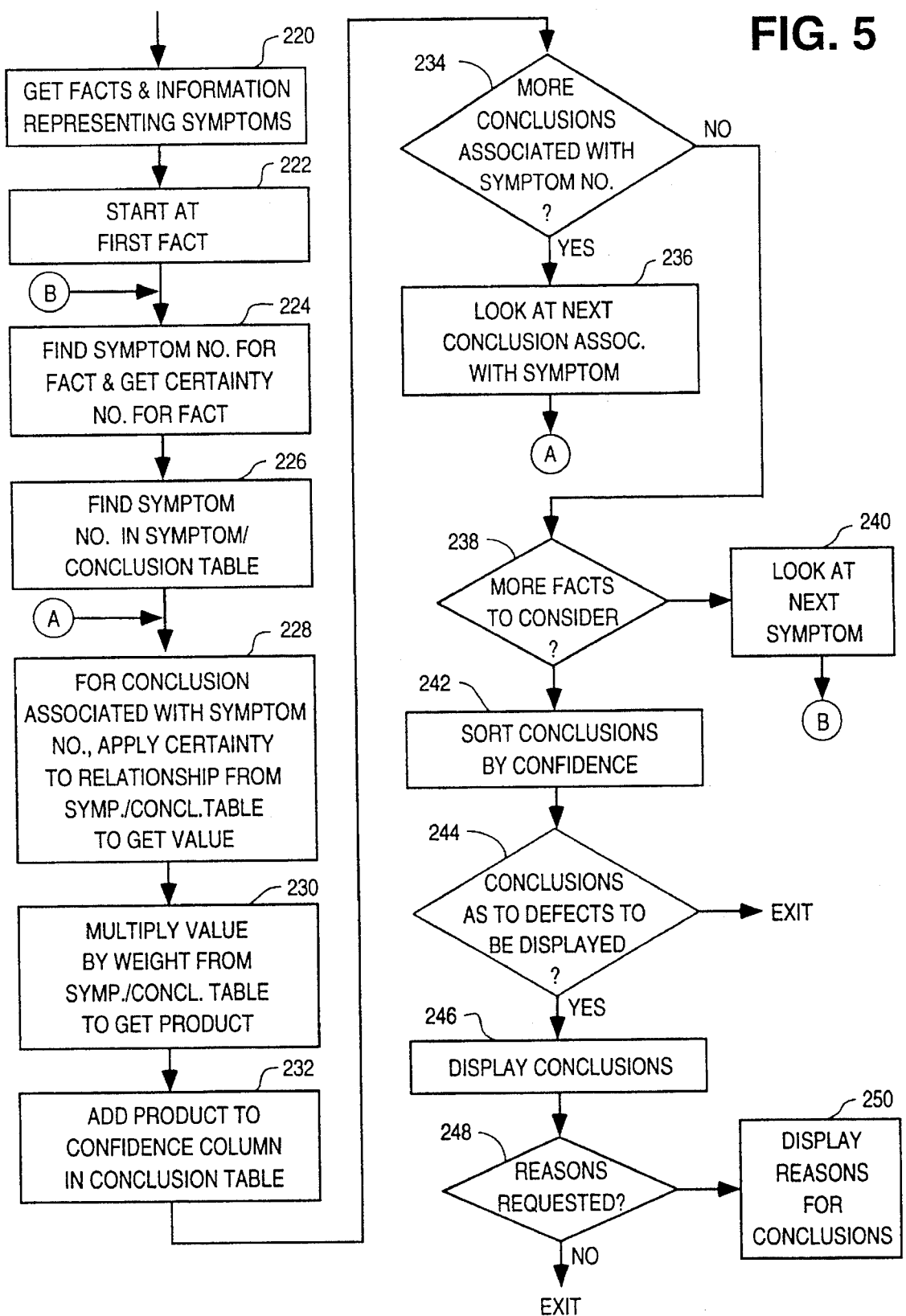
FIG. 5 is a flow chart illustrating a Defect Advisor software subroutine implemented by the system depicted in FIG. 1.

The microprocessor 44 operates in accordance with the defect advisor, as illustrated in FIG. 5. When the defect advisor is called, the microprocessor 44 at block 220 retrieves the various facts and information representing the symptoms of the system obtained since the defect advisor was last called. Thereafter, at a block 222, the microprocessor 44 increments to the first fact of facts retrieved at block 220. The microprocessor 44 then finds at block 224 the symptom number for the fact, and the certainty number for the fact from the symptom table 90. At block 226, the microprocessor 44 finds that symptom number in the symptom/conclusion table 103. Thereafter, at block 228, for the first conclusion associated with the symptom number in the symptom/conclusion table, the microprocessor 44 applies the certainty factor retrieved at block 224 to the relationship identified for the conclusion and symptom in the symptom/conclusion table 103 to obtain a value. At block 230 the microprocessor 44 multiplies the value obtained at block 228 by the weight stored in the symptom/conclusion table for the particular symptom and conclusion to obtain a product. This product is added by the microprocessor at block 232 to the confidence factor in column 122 of the conclusion table 120 associated with the particular conclusion being analyzed. At block 234, if there are more conclusions associated with the particular symptom number, the microprocessor proceeds to block 236 to look at the next associated conclusion and, thereafter returns to block 228. If there are no more conclusions associated with a particular symptom number, the microprocessor proceeds from block 234 to block 238. At block 238 the microprocessor 44 determines whether there are more facts, i.e. symptoms to consider, and if so, proceeds to block 240 to look at the next symptom. If each of the facts in the set retrieved at block 220 has been considered, as determined by the microprocessor at block 238, the microprocessor proceeds to block 242. At block 242 the microprocessor 44 sorts the conclusions by the level of the confidence factor associated with each conclusion. Thereafter, at block 244 the microprocessor determines whether the conclusions are to be displayed and, if so, the microprocessor displays the conclusions i.e., the type of defect most likely to occur or to have occurred based upon the symptoms of the system. At block 248 the microprocessor 44 determines whether the operator has requested reasons for a particular conclusion and, if so, at block 250 displays the reasons for the conclusions on the display 28. FIG. 26 is an example of a screen that may be displayed to illustrate or aid in the defect analysis. It is noted that the defect analysis advisor may be completely automated or, operator inputs may be requested so as to be primarily automatic, but allowing an operator to select the certainty of one or more symptoms, for example.

The printing press monitoring and advising system of the present invention is an expert, intelligent system that operates in real time to advise the press operator as to potential problems during the operation of the press, as well as to identify the type and/or the cause of defects that are detected. The system automatically advises the press operator as to recommended press operation settings prior to the start of the press, and during continuous press operation when a new roll is automatically spliced in, the system automatically sets new tension levels in response to the data associated with the new roll. The system of the present invention minimizes downtime of the press, as well as waste of resources. Many modifications and variations of the present invention are possible in light of the above teachings. Thus, it is to be understood that, within the scope of the appended claims, the invention may be practiced otherwise than as described hereinabove.

What is claimed and desired to be secured by Letters Patent is:

1. A real time, intelligent printing press monitoring system for collecting and analyzing data representing the operation of a press and paper being run on the press, comprising:

a plurality of sensors for monitoring a plurality of characteristics of the press and the paper being run on the press to provide real time sensor data;

means for storing said real time sensor data, at least a portion of said sensor data representing sensed symptoms of said press and paper;

means for storing a symptom table identifying a plurality of symptoms, a conclusion table identifying a plurality of defects in said press and paper and a symptom/conclusion table relating the defects in said conclusion table to the symptoms in said symptom table; and means for analyzing said sensed symptoms in real time as said data is collected utilizing said symptom table, conclusion table, and symptom/conclusion table to identify a most likely defect in said paper or press.

2. A real time, intelligent printing press monitoring system as recited in claim 1 wherein a plurality of said paper characteristic sensors include tension sensors for monitoring the tension of said paper being run at a number of positions along said press.

3. A real time, intelligent printing press monitoring system as recited in claim 1 wherein said press includes ink for printing and said system includes a plurality of sensors for monitoring the temperature of said ink to provide real time temperature sensor data.

4. A real time, intelligent printing press monitoring system as recited in claim 1 wherein said press includes at least one speed sensor for monitoring the speed of said paper.

5. A real time, intelligent printing press monitoring system as recited in claim 1 wherein said paper characteristic sensors include at least one sensor for detecting an edge crack in said paper.

6. A real time, intelligent printing press monitoring system as recited in claim 1 wherein said paper characteristic sensors include at least one sensor for detecting a hole in said paper.

7. A real time, intelligent printing press monitoring system as recited in claim 1 wherein said paper characteristic sensors include at least one sensor for detecting a break in said paper.

8. A real time, intelligent printing press monitoring system as recited in claim 1 wherein said plurality of sensors includes at least one tension sensor and said system further includes means for displaying said tension sensor data in real time as said data is collected.

9. A real time, intelligent printing press monitoring system as recited in claim 8 wherein said display means displays said tension sensor data in real time relative to recommended tension levels.

10. A real time, intelligent printing press monitoring system as recited in claim 9 wherein said conclusion table further identifies a plurality of press operation settings including tension level settings, said symptom/conclusion table relates each of said operation settings to at least one symptom and said analyzing means analyzes said sensed symptoms utilizing said symptom table, conclusion table, and symptom/conclusion table to recommend press operation settings including at least one tension level setting.

11. A real time, intelligent printing press monitoring system for collecting and analyzing data representing the operation of a press and data representing a roll or paper being run on the press, comprising:

means for storing historical data relating to previously run paper rolls and past press operations;

means for retrieving from said historical data storing means data related to the paper roll being run and data related to the press on which said paper roll is being run, said retrieved data representing historical data symptoms;

a plurality of sensors for monitoring a plurality of characteristics of the press and paper being run on the press to provide real time sensor data;

means for storing the real time sensor data collected from said plurality of sensors, at least a portion of said stored real time sensor data representing sensed symptoms of said press and paper;

means for storing a symptom table identifying a plurality of symptoms, a conclusion table identifying a plurality of defects and a symptom conclusion table relating each defect in said conclusion table to at least one symptom in said symptom table; and means for analyzing said sensed symptoms during the operation of said press with said historical data symptoms utilizing said symptom table, conclusion table, and symptom/conclusion table.

12. A real time, intelligent printing press monitoring system as recited in claim 11 wherein a plurality of said paper characteristic sensors include tension sensors for monitoring the tension of said paper being run at a number of positions along said press.

13. A real time, intelligent printing press monitoring system as recited in claim 11 wherein said press includes ink for printing and said system includes a plurality of sensors for monitoring the temperature of said ink to provide real time temperature sensor data.

14. A real time, intelligent printing press monitoring system as recited in claim 11 wherein said press includes at least one speed sensor for monitoring the speed of said paper.

15. A real time, intelligent printing press monitoring system as recited in claim 11 wherein said paper characteristic sensors include at least one sensor for detecting an edge crack in said paper.

16. A real time, intelligent printing press monitoring system as recited in claim 11 wherein said paper characteristic sensors include at least one sensor for detecting a hole in said paper.

17. A real time, intelligent printing press monitoring system as recited in claim 11 wherein said paper characteristic sensors include at least one sensor for detecting a break in said paper.

18. A real time, intelligent printing press monitoring system as recited in claim 11 wherein said plurality of sensors includes at least one tension sensor and said system further includes means for displaying said tension sensor data in real time as it is collected.

19. A real time, intelligent printing press monitoring system as recited in claim 18 wherein said display means displays said tension sensor data in real time relative to recommended tension levels.

20. A real time, intelligent printing press monitoring system as recited in claim 19 wherein said conclusion table further identifies a plurality of press operation settings including tension level settings, said symptom/conclusion table relates each of said operation settings to at least one symptom and said analyzing means analyzes said sensed symptoms utilizing said symptom table, conclusion table, and symptom/conclusion table to recommend press operation settings including at least one tension level setting.

21. A real time, intelligent printing press monitoring system as recited in claim 11 wherein said retrieved historical data related to said press on which said paper is being run includes data gathered from the operation of said specific press.

22. A real time, intelligent printing press monitoring system as recited in claim 21 wherein said retrieved historical data related to said press on which said paper is being run includes data gathered from the operation of at least one other press of a type similar to the type of press on which said paper is being run.

23. A real time, intelligent printing press monitoring system as recited in claim 11 wherein said retrieved historical data related to said paper roll being run includes data gathered from a previously run paper roll received from the same supplier as the supplier of the paper roll being run.

24. A real time, intelligent printing press monitoring system as recited in claim 11 wherein said retrieved historical data related to said paper roll being run includes data gathered from a previously run paper roll received from the same supplier as the supplier of the paper roll being run and of the same grade as the grade of the paper roll being run.

25. A method of monitoring the operations of a printing press and a paper roll being run on the press in real time comprising:

monitoring a plurality of characteristics of the press and the paper being run on the press to provide real time sensor data;

storing at least a portion of said sensor data to collect said data as sensed symptoms of said system;

storing a symptom table identifying a plurality of symptoms, a conclusion table identifying a plurality of defects and a symptom/conclusion table relating the defects in said conclusion table to the symptoms in said symptom table; and analyzing said sensed symptoms in real time as said data is collected utilizing said symptom table, conclusion table and said symptom/conclusion table.

26. A method of monitoring the operations of a printing press and analyzing the data therefrom in real time as recited in claim 25 including the steps of storing historical data relating to previously run paper rolls and past press operations; retrieving stored historical data related to the paper roll being run and stored historical data related to the press on which said paper roll is being run, said retrieved data representing historical data symptoms; and wherein said analyzing step includes analyzing said sensed symptoms with said historical data symptoms utilizing said symptom table, said conclusion table and said symptom/conclusion table during the operation of said press.

27. A method of monitoring the operations of a printing press and a roll of paper run on said press, comprising:

receiving input data identifying the press and a roll of paper to be run on the press, at least a portion of said input data representing symptoms;

storing historical data representing previously run paper rolls and past press operations, at least a portion of said historical data representing symptoms;

storing information in a symptom table identifying a plurality of symptoms, information in a conclusion table identifying a plurality of press operation settings including tension settings and information in a symptom/conclusion table relating each press operation setting to at least one symptom in said symptom table; and analyzing said input data representing symptoms with said historical data symptoms to determine preferred press operation settings.

28. A method of monitoring the operations of a printing press as recited in claim 27 wherein said plurality of press operation settings includes a temperature level setting for ink used in said press.

29. A method of monitoring the operations of a printing press as recited in claim 27 wherein said plurality of press operation settings includes a ratio setting of ink to ink solvents used in said press.

30. A method of monitoring the operations of a printing press as recited in claim 27 wherein said analyzing step includes assigning a confidence value to said press operation settings based on information stored in said symptom/conclusion table and sorting said conclusions according to the assigned confidence values.

31. A method of monitoring the operations of a printing press as recited in claim 30 including displaying the press operation setting having the highest confidence value as said preferred press operation setting and displaying a plurality of symptoms upon which said analysis is based.

32. A method of monitoring the operations of a printing press on which rolls of paper are run, comprising:

receiving input data identifying the press and roll of paper to be run on the press, at least a portion of said input data representing symptoms;

storing historical data representing previously run paper rolls and past press operations, at least a portion of said historical data representing symptoms;

storing information in a symptom table identifying a plurality of symptoms, information in a conclusion table identifying a plurality of press operation settings including tension settings and information in a symptom/conclusion table relating each press operation setting to at least one symptom in said symptom table;

analyzing said input data representing symptoms with said historical data symptoms to determine preferred press operation settings;

monitoring in real time a plurality of operations of said press having determined press operation settings; and displaying said monitored press operations in real time relative to said recommended press settings.

33. A method of monitoring the operations of a printing press as recited in claim 30 including storing a plurality of said real time data; and displaying said data to illustrate a history of said press operation.

34. A method of monitoring operations of a press printing on a roll of paper comprising:

monitoring in real time a plurality of operations of said press to provide real time input data, said input data representing symptoms;

displaying at least a portion of said input data in real time;

determining the occurrence of an event representing a likelihood of a defect in said paper printing operations;

storing information in a symptom table identifying a plurality of symptoms, information in a conclusion table identifying each type of a plurality of defects and information in a symptom/conclusion table relating each defect in said conclusion table to at least one symptom in said symptom table; and analyzing said input data representing symptoms in response to a determination of an occurrence of an event representing the likelihood of a defect utilizing said symptom table, said conclusion table and said symptom/conclusion table, said analysis including:

assigning a confidence value to each of a plurality of said conclusion types in said conclusion table based upon information stored in said symptom/conclusion table; and sorting said conclusion types according to said assigned confidence values.

35. A method of monitoring the operations of a printing press as recited in claim 34 including the step of displaying information identifying the defect type having the highest confidence value.

36. A method of monitoring the operations of a printing press as recited in claim 35 including the step of displaying a plurality of the symptoms upon which said analysis is based.

37. An intelligent printing press monitoring system for analyzing data representing the operations of said press and a roll of paper being run on said press, comprising:

means for receiving input data identifying the press and roll of paper to be run on the press, at least a portion of said input data representing symptoms;

means for storing historical data representing previously run paper rolls and past press operations, at least a portion of said historical data representing symptoms;

means for storing information in a symptom table identifying a plurality of symptoms, information in a defect table identifying a plurality of press operation settings including tension settings and information in a symptom/conclusion table relating each press operation setting to at least one symptom in said symptom table; and means for analyzing said input data symptoms with said historical data symptoms to determine preferred press operation settings.

38. An intelligent printing press monitoring system as recited in claim 37 wherein said analyzing means includes:

means for assigning a confidence value to said press operation settings based on information stored in said symptom/conclusion table; and means for sorting said conclusions according to the assigned confidence values.

39. An intelligent printing press monitoring system as recited in claim 37 including means for displaying the press operation setting having the highest confidence value as said preferred press operation setting and displaying a plurality of the symptoms upon which said analysis is based.

40. An intelligent printing press monitoring system for analyzing data representing the operations of said press and a roll of paper being run on said press, comprising:

means for receiving input data identifying the press and roll of paper to be run on the press, at least a portion of said input data representing symptoms;

means for storing historical data representing previously run paper rolls and past press operations, at least a portion of said historical data representing symptoms;

means for storing information in a symptom table identifying a plurality of symptoms, information in a conclusion table identifying a plurality of press operation settings including tension settings and information in a symptom/conclusion table relating each press operation setting to at least one symptom in said symptom table; and means for analyzing said input data representing symptoms with said historical data symptoms to determine preferred press operation settings;

monitoring in real time a plurality of operations of said press having determined press operation settings; and displaying said monitored press operations in real time relative to said recommended press settings.

41. An intelligent printing press monitoring system for analyzing data representing the operations of said press and a roll of paper being run on said press, comprising:

means for monitoring in real time a plurality of said operations of said press to provide real time input data, said input data representing symptoms;

means for displaying at least a portion of said input data in real time;

means for determining the occurrence of an event representing a likelihood of a defect in said paper printing operations;

means for storing information in a symptom table identifying a plurality of symptoms, information in a conclusion table identifying each type of a plurality of defects and information in a symptom/conclusion table relating each defect in said conclusion table to at least one symptom in said symptom table; and means for analyzing said input data representing symptoms in response to a determination of an occurrence of an event representing the likelihood of a defect utilizing said symptom table, said conclusion table and said symptom/conclusion table, said analyzing means including:

means for assigning a confidence value to said defect type based on information stored in said symptom/conclusion table; and means for sorting said defect types according to said assigned confidence values.

42. An intelligent printing press monitoring system as recited in claim 41 including means for displaying information identifying the defect type having the highest confidence value.

43. An intelligent printing press monitoring system as recited in claim 42 wherein said display means displays a plurality of the symptoms upon which said analysis is based.

44. An intelligent printing press monitoring system for analyzing data representing the operations of a press and a roll of paper being run on said press comprising:

> means for inputting data identifying said press and characteristics of said press;
>
> means for storing input data;
>
> means for storing historical data representing previously run paper rolls and past press operations;
>
> a start up software module operable upon a start of the operation of said press and responsive to said stored input data and historical data for selecting from a plurality of press tension settings at least one preferred tension setting;
>
> means for monitoring a plurality of press operations including characteristics of the paper being run on said press to detect defects of various types; and
>
> an inference engine software module for analyzing said monitored press operations to identify a possible type of a defect as the defect is detected.

* * * * *